United States Patent
Rappaport et al.

(10) Patent No.: US 7,680,644 B2
(45) Date of Patent: *Mar. 16, 2010

(54) METHOD AND SYSTEM, WITH COMPONENT KITS, FOR DESIGNING OR DEPLOYING A COMMUNICATIONS NETWORK WHICH CONSIDERS FREQUENCY DEPENDENT EFFECTS

(75) Inventors: Theodore Rappaport, Austin, TX (US); Roger Skidmore, Austin, TX (US); Eric Reifsneider, Vancouver, WA (US)

(73) Assignee: Wireless Valley Communications, Inc., Austin, TX (US)

( * ) Notice: Subject to any disclaimer, the term of this patent is extended or adjusted under 35 U.S.C. 154(b) by 960 days.

This patent is subject to a terminal disclaimer.

(21) Appl. No.: 10/697,557

(22) Filed: Oct. 31, 2003

(65) Prior Publication Data

US 2004/0133415 A1    Jul. 8, 2004

Related U.S. Application Data

(60) Division of application No. 10/606,115, filed on Jun. 26, 2003, now Pat. No. 7,171,208, which is a continuation of application No. 09/633,121, filed on Aug. 4, 2000, now Pat. No. 6,625,454.

(51) Int. Cl.
*G06G 7/62* (2006.01)
*G06F 13/12* (2006.01)
*H04W 24/00* (2009.01)
*H04M 11/08* (2006.01)
*H04B 17/00* (2006.01)
*H04B 15/00* (2006.01)

(52) U.S. Cl. ............... 703/21; 703/4; 703/13; 455/423; 455/456.1; 455/404.2; 455/67.11; 455/63.3

(58) Field of Classification Search .................. 703/4, 703/13, 21–22; 455/446, 423, 456.1, 67.11, 455/63.3
See application file for complete search history.

(56) References Cited

U.S. PATENT DOCUMENTS

| | | |
|---|---|---|
| 4,675,147 A | 6/1987 | Schaefer et al. |
| 4,736,453 A | 4/1988 | Schloemer |
| 4,817,012 A | 3/1989 | Cali |
| 4,885,694 A | 12/1989 | Pray et al. |
| 4,964,060 A | 10/1990 | Hartsog |
| 5,091,869 A | 2/1992 | Ingram et al. |
| 5,111,392 A | 5/1992 | Malin |
| 5,119,307 A | 6/1992 | Blaha et al. |
| 5,239,487 A | 8/1993 | Horejsi et al. |
| 5,293,640 A | 3/1994 | Gunmar et al. |
| 5,307,261 A | 4/1994 | Maki et al. |
| 5,337,149 A | 8/1994 | Kozah et al. |
| 5,339,184 A | 8/1994 | Tang |
| 5,341,461 A | 8/1994 | Kikuchi et al. |
| 5,375,123 A | 12/1994 | Andersson et al. |
| 5,394,522 A | 2/1995 | Sanchez-Frank et al. |
| 5,425,076 A | 6/1995 | Knippelmier |
| 5,450,615 A | 9/1995 | Fortune et al. |
| 5,458,123 A | 10/1995 | Unger |
| 5,463,464 A | 10/1995 | Ladewski |
| 5,465,153 A | 11/1995 | Ladewski |
| 5,465,390 A | 11/1995 | Cohen |
| 5,467,441 A | 11/1995 | Stone et al. |
| 5,482,050 A | 1/1996 | Smokoff et al. |
| 5,485,568 A | 1/1996 | Venable et al. |
| 5,491,644 A | 2/1996 | Pickering et al. |
| 5,491,837 A | 2/1996 | Haartsen |
| 5,493,679 A | 2/1996 | Virgil et al. |
| 5,513,323 A * | 4/1996 | Williams et al. ............ 709/246 |
| 5,515,269 A * | 5/1996 | Willis et al. ................ 705/29 |
| 5,517,575 A | 5/1996 | Ladewski |
| 5,528,518 A | 6/1996 | Bradshaw et al. |
| 5,539,665 A | 7/1996 | Lamming et al. |
| 5,553,312 A | 9/1996 | Gattey et al. |
| 5,553,620 A | 9/1996 | Snider et al. |
| 5,555,354 A | 9/1996 | Strasnick et al. |
| 5,561,841 A | 10/1996 | Markus |
| 5,564,070 A | 10/1996 | Want et al. |
| 5,586,254 A | 12/1996 | Kondo et al. |
| 5,594,946 A | 1/1997 | Menich et al. |

| Patent | Kind | Date | Inventor | Class |
|---|---|---|---|---|
| 5,598,532 | A | 1/1997 | Liron | |
| 5,608,854 | A | 3/1997 | Labedz et al. | |
| 5,625,827 | A | 4/1997 | Krause et al. | |
| 5,627,879 | A | 5/1997 | Russell et al. | |
| 5,636,344 | A | 6/1997 | Lewis | |
| 5,668,939 | A | 9/1997 | Numao et al. | |
| 5,689,355 | A | 11/1997 | Okubo et al. | |
| 5,689,705 | A | 11/1997 | Fino et al. | |
| 5,710,758 | A | 1/1998 | Soliman et al. | |
| 5,726,979 | A | 3/1998 | Henderson et al. | |
| 5,754,831 | A * | 5/1998 | Berman | 703/13 |
| 5,755,072 | A | 5/1998 | Lingafelter | |
| 5,761,093 | A | 6/1998 | Urbish et al. | |
| 5,761,674 | A | 6/1998 | Ito | |
| 5,774,669 | A | 6/1998 | George et al. | |
| 5,794,128 | A | 8/1998 | Brockel et al. | |
| 5,799,154 | A | 8/1998 | Kuriyan | |
| 5,802,146 | A | 9/1998 | Dulman | |
| 5,808,905 | A * | 9/1998 | Normann et al. | 703/2 |
| 5,809,282 | A | 9/1998 | Cooper et al. | |
| 5,815,395 | A | 9/1998 | Hart et al. | |
| 5,821,937 | A * | 10/1998 | Tonelli et al. | 715/853 |
| 5,825,759 | A | 10/1998 | Liu | |
| 5,828,960 | A | 10/1998 | Tang et al. | |
| 5,831,610 | A | 11/1998 | Tonelli et al. | |
| 5,832,389 | A | 11/1998 | Dent | |
| 5,845,124 | A | 12/1998 | Berman | |
| 5,859,839 | A | 1/1999 | Ahlenius et al. | |
| 5,861,887 | A | 1/1999 | Butler et al. | |
| 5,867,112 | A | 2/1999 | Kost | |
| 5,877,777 | A | 3/1999 | Colwell | |
| 5,878,328 | A | 3/1999 | Chawla et al. | |
| 5,907,494 | A | 5/1999 | Dangelo et al. | |
| 5,907,850 | A | 5/1999 | Krause et al. | |
| 5,917,808 | A | 6/1999 | Kosbab | |
| 5,920,607 | A | 7/1999 | Berg | |
| 5,923,850 | A | 7/1999 | Barroux | |
| 5,926,762 | A | 7/1999 | Arpee et al. | |
| 5,940,196 | A | 8/1999 | Piehler et al. | |
| 5,945,976 | A | 8/1999 | Iwamura et al. | |
| 5,948,055 | A | 9/1999 | Pulsipher et al. | |
| 5,949,335 | A | 9/1999 | Maynard | |
| 5,949,988 | A | 9/1999 | Feisullin et al. | |
| 5,953,669 | A * | 9/1999 | Stratis et al. | 455/449 |
| 5,956,028 | A | 9/1999 | Matsui et al. | |
| 5,963,867 | A | 10/1999 | Reynolds et al. | |
| 5,970,406 | A | 10/1999 | Komara | |
| 5,977,851 | A | 11/1999 | Stancil et al. | |
| 5,982,330 | A | 11/1999 | Koyanagi et al. | |
| 5,984,511 | A | 11/1999 | Vasey-Glandon et al. | |
| 5,986,670 | A | 11/1999 | Dries et al. | |
| 5,987,328 | A | 11/1999 | Ephremides et al. | |
| 5,994,984 | A | 11/1999 | Stancil et al. | |
| 6,002,941 | A | 12/1999 | Ablay et al. | |
| 6,006,021 | A | 12/1999 | Tognazzini | |
| 6,012,152 | A | 1/2000 | Douik et al. | |
| 6,014,565 | A | 1/2000 | Bonta | |
| 6,018,625 | A * | 1/2000 | Hayball et al. | 703/22 |
| 6,021,316 | A | 2/2000 | Heiska et al. | |
| 6,032,105 | A | 2/2000 | Lee et al. | |
| 6,038,547 | A | 3/2000 | Casto | |
| 6,044,273 | A | 3/2000 | Tekinay | |
| 6,058,102 | A | 5/2000 | Drysdale et al. | |
| 6,058,262 | A | 5/2000 | Kawas et al. | |
| 6,059,842 | A | 5/2000 | Dumarot et al. | |
| 6,061,722 | A | 5/2000 | Lipa et al. | |
| 6,075,541 | A | 6/2000 | Maclinovsky | |
| 6,084,168 | A | 7/2000 | Sitrick | |
| 6,085,335 | A | 7/2000 | Djoko et al. | |
| 6,088,522 | A | 7/2000 | Lee et al. | |
| 6,091,362 | A | 7/2000 | Stilp et al. | |
| 6,104,699 | A | 8/2000 | Holender et al. | |
| 6,108,309 | A | 8/2000 | Cohoe et al. | |
| 6,111,857 | A | 8/2000 | Soliman et al. | |
| 6,112,088 | A | 8/2000 | Haartsen | |
| 6,119,009 | A | 9/2000 | Baranger et al. | |
| 6,119,010 | A | 9/2000 | Labedz | |
| 6,122,083 | A | 9/2000 | Ohta et al. | |
| 6,134,514 | A * | 10/2000 | Liu et al. | 703/17 |
| 6,141,016 | A * | 10/2000 | Yuura et al. | 345/619 |
| 6,148,010 | A | 11/2000 | Sutton et al. | |
| 6,151,310 | A | 11/2000 | Dent | |
| 6,162,488 | A | 12/2000 | Gevelber et al. | |
| 6,199,032 | B1 | 3/2001 | Anderson | |
| 6,204,813 | B1 | 3/2001 | Wadell et al. | |
| 6,208,833 | B1 | 3/2001 | Preschutti et al. | |
| 6,229,540 | B1 | 5/2001 | Tonelli et al. | |
| 6,236,409 | B1 | 5/2001 | Hartman | |
| 6,243,772 | B1 | 6/2001 | Ghori et al. | |
| 6,253,086 | B1 | 6/2001 | Parantainen et al. | |
| 6,256,506 | B1 | 7/2001 | Alexander, Jr. et al. | |
| 6,259,924 | B1 | 7/2001 | Alexander, Jr. et al. | |
| 6,266,615 | B1 | 7/2001 | Jin | |
| 6,272,447 | B1 | 8/2001 | Gavin et al. | |
| 6,283,759 | B1 | 9/2001 | Price et al. | |
| 6,285,377 | B1 | 9/2001 | Greenbaum et al. | |
| 6,289,203 | B1 | 9/2001 | Smith et al. | |
| 6,289,299 | B1 * | 9/2001 | Daniel et al. | 703/21 |
| 6,295,535 | B1 | 9/2001 | Radcliffe et al. | |
| 6,308,072 | B1 | 10/2001 | Labedz et al. | |
| 6,311,144 | B1 | 10/2001 | Abu El Ata | |
| 6,317,599 | B1 | 11/2001 | Rappaport et al. | 455/446 |
| 6,326,987 | B2 | 12/2001 | Alexander | |
| 6,330,005 | B1 | 12/2001 | Tonelli et al. | |
| 6,331,836 | B1 | 12/2001 | Jandrell | |
| 6,337,688 | B1 | 1/2002 | Berstis | |
| 6,338,031 | B1 | 1/2002 | Lee et al. | |
| 6,345,239 | B1 | 2/2002 | Bowman-Amuah | |
| 6,356,758 | B1 | 3/2002 | Almeida et al. | |
| 6,385,454 | B1 | 5/2002 | Bahl et al. | |
| 6,393,432 | B1 | 5/2002 | Flansburg et al. | |
| 6,408,312 | B1 | 6/2002 | Forthman et al. | |
| 6,424,264 | B1 | 7/2002 | Giraldin et al. | |
| 6,442,507 | B1 | 8/2002 | Skidmore et al. | |
| 6,446,031 | B1 * | 9/2002 | Welch | 703/2 |
| 6,459,435 | B1 | 10/2002 | Eichel | |
| 6,466,938 | B1 | 10/2002 | Goldberg | |
| 6,470,195 | B1 | 10/2002 | Meyer | |
| 6,487,414 | B1 | 11/2002 | Tanay et al. | |
| 6,487,417 | B1 | 11/2002 | Rossoni et al. | |
| 6,493,679 | B1 | 12/2002 | Rappaport et al. | 705/29 |
| 6,496,290 | B1 | 12/2002 | Lee | 359/136 |
| 6,499,006 | B1 | 12/2002 | Rappaport et al. | |
| 6,505,045 | B1 | 1/2003 | Hills et al. | |
| 6,509,906 | B1 | 1/2003 | Awe et al. | |
| 6,519,571 | B1 * | 2/2003 | Guheen et al. | 705/14 |
| 6,560,569 | B1 * | 5/2003 | Abu El Ata | 703/2 |
| 6,611,867 | B1 * | 8/2003 | Bowman-Amuah | 709/224 |
| 6,615,166 | B1 * | 9/2003 | Guheen et al. | 703/27 |
| 6,625,454 | B1 * | 9/2003 | Rappaport et al. | 455/446 |
| 6,674,403 | B2 * | 1/2004 | Gray et al. | 342/463 |
| 6,675,328 | B1 | 1/2004 | Krishnamachari et al. | |
| 6,681,140 | B1 | 1/2004 | Heil | |
| 6,690,652 | B1 | 2/2004 | Sadri | |
| 6,708,329 | B1 * | 3/2004 | Whitehill et al. | 717/136 |
| 6,721,614 | B2 * | 4/2004 | Duncan et al. | 700/97 |
| 6,721,769 | B1 | 4/2004 | Rappaport et al. | |
| 6,754,488 | B1 | 6/2004 | Won et al. | |
| 6,772,103 | B1 | 8/2004 | King | |
| 6,785,547 | B1 | 8/2004 | Heiska et al. | |
| 6,791,571 | B1 | 9/2004 | Lamb | |
| 6,795,858 | B1 | 9/2004 | Jain et al. | |
| 6,804,578 | B1 | 10/2004 | Ghaffari | |
| 6,850,946 | B1 | 2/2005 | Rappaport et al. | |
| 6,876,951 | B2 | 4/2005 | Skidmore et al. | |
| 6,901,051 | B1 | 5/2005 | Hou et al. | |

| | | |
|---|---|---|
| 6,912,487 B1 * | 6/2005 | Garcia et al. .................. 703/1 |
| 6,931,364 B1 | 8/2005 | Anturna |
| 6,947,708 B2 | 9/2005 | Fattouch |
| 6,971,063 B1 * | 11/2005 | Rappaport et al. .......... 715/733 |
| 6,973,622 B1 | 12/2005 | Rappaport et al. |
| 7,019,753 B2 | 3/2006 | Rappaport et al. |
| 7,023,356 B2 | 4/2006 | Burkhardt et al. |
| 7,035,642 B2 | 4/2006 | Rappaport et al. |
| 7,047,014 B1 * | 5/2006 | Friday et al. ................ 455/446 |
| 7,054,643 B2 | 5/2006 | Trossen et al. |
| 7,055,107 B1 * | 5/2006 | Rappaport et al. .......... 715/848 |
| 7,085,697 B1 * | 8/2006 | Rappaport et al. ............ 703/13 |
| 7,096,034 B2 | 8/2006 | Zhang et al. |
| 7,096,160 B2 | 8/2006 | Skidmore et al. |
| 7,096,173 B1 * | 8/2006 | Rappaport et al. ............ 703/13 |
| 7,124,101 B1 | 10/2006 | Mikurak |
| 7,155,228 B2 | 12/2006 | Rappaport et al. |
| 7,162,507 B2 | 1/2007 | Carter |
| 7,164,883 B2 | 1/2007 | Rappaport et al. |
| 7,171,208 B2 * | 1/2007 | Rappaport et al. .......... 455/445 |
| 7,235,766 B2 | 6/2007 | Shur et al. |
| 7,243,054 B2 | 7/2007 | Rappaport et al. |
| 7,246,045 B1 | 7/2007 | Rappaport et al. |
| 7,263,471 B2 * | 8/2007 | Barbaresi et al. ............... 703/2 |
| 7,286,971 B2 | 10/2007 | Rappaport et al. |
| 7,295,119 B2 | 11/2007 | Rappaport et al. |
| 7,295,960 B2 * | 11/2007 | Rappaport et al. ............ 703/13 |
| 7,299,168 B2 | 11/2007 | Rappaport et al. |
| 7,539,495 B2 * | 5/2009 | Kalika et al. ................ 455/446 |
| 2001/0011215 A1 * | 8/2001 | Beeker et al. ................. 703/27 |
| 2001/0051503 A1 | 12/2001 | Lush |
| 2002/0023244 A1 | 2/2002 | Hatanaka et al. |
| 2002/0028681 A1 | 3/2002 | Lee et al. |
| 2002/0030600 A1 | 3/2002 | Starner et al. |
| 2002/0046259 A1 | 4/2002 | Glorikian |
| 2002/0059052 A1 * | 5/2002 | Bloch et al. ................... 703/13 |
| 2002/0075825 A1 | 6/2002 | Hills et al. |
| 2002/0082859 A1 | 6/2002 | Lancos et al. |
| 2002/0093926 A1 * | 7/2002 | Kilfoyle ..................... 370/335 |
| 2002/0095486 A1 | 7/2002 | Bahl |
| 2002/0130861 A1 * | 9/2002 | Ujiie et al. .................. 345/420 |
| 2002/0177982 A1 | 11/2002 | Boulouednine et al. |
| 2002/0188717 A1 * | 12/2002 | Mushlin et al. ............. 709/224 |
| 2003/0023411 A1 | 1/2003 | Witmer et al. |
| 2003/0023718 A1 * | 1/2003 | Smith, II ..................... 709/224 |
| 2003/0050878 A1 | 3/2003 | Rappaport et al. |
| 2003/0225563 A1 * | 12/2003 | Gonos .......................... 703/22 |
| 2003/0229478 A1 | 12/2003 | Rappaport et al. |
| 2003/0232598 A1 | 12/2003 | Aljadeff et al. |
| 2004/0002364 A1 | 1/2004 | Trikkonen et al. |
| 2004/0017790 A1 | 1/2004 | del Prado et al. |
| 2004/0038683 A1 | 2/2004 | Rappaport et al. |
| 2004/0072577 A1 | 4/2004 | Myllymaki et al. |
| 2004/0077359 A1 | 4/2004 | Bernas et al. |
| 2004/0090943 A1 | 5/2004 | da Costa et al. |
| 2004/0122645 A1 * | 6/2004 | Shevenell et al. ............. 703/21 |
| 2004/0133415 A1 | 7/2004 | Rappaport et al. |
| 2004/0143428 A1 * | 7/2004 | Rappaport et al. ............ 703/22 |
| 2004/0162840 A1 | 8/2004 | Rappaport et al. |
| 2004/0177085 A1 | 9/2004 | Rappaport et al. |
| 2004/0186847 A1 | 9/2004 | Rappaport et al. |
| 2004/0202196 A1 | 10/2004 | Sindhushayana et al. |
| 2004/0211888 A1 | 10/2004 | Shur et al. |
| 2004/0259554 A1 | 12/2004 | Rappaport et al. |
| 2004/0259555 A1 | 12/2004 | Rappaport et al. |
| 2005/0131619 A1 | 6/2005 | Rappaport et al. |
| 2005/0143077 A1 * | 6/2005 | Charbonneau .............. 455/446 |
| 2005/0204028 A1 * | 9/2005 | Bahl et al. .................. 709/223 |
| 2005/0253751 A1 | 11/2005 | Feisst et al. |
| 2005/0265321 A1 | 12/2005 | Rappaport et al. |
| 2006/0015814 A1 | 1/2006 | Rappaport et al. |
| 2006/0019679 A1 | 1/2006 | Rappaport et al. |
| 2006/0036406 A1 | 2/2006 | Skidmore et al. |
| 2006/0116853 A1 | 6/2006 | Rappaport et al. |
| 2007/0099622 A1 | 5/2007 | Rappaport et al. |
| 2007/0117567 A1 | 5/2007 | Rappaport et al. |

FOREIGN PATENT DOCUMENTS

| | | |
|---|---|---|
| WO | 0013115 | 3/2000 |

OTHER PUBLICATIONS

Website "WiSE Design of Indoor & Outdoor Wireless Systems"—http://web.archive.org/web/20021219083421/www.bell-labs.com/org/wireless/wisext.html—Dec. 2002.*
WISE design of indoor wireless systems: practical computation and optimization—Fortune, S.J. et al; Publication Date: Spring 1995 vol. 2, Issue: 1 On pp. 58-68 ISSN: 1070-9924 Posted online: Aug. 6, 2002 20:04:06.0.*
Rendering Tcl/TK windows as HTML; Wilfred Hansen; Mar. 5, 2003—Carnegi Mellon University.*
A comparison of theoretical and empirical reflection coefficients for typical exterior wall surfaces in a mobile radio environment, Landron, O.; Feuerstein, M.J.; Rappaport, T.S. Antennas and Propagation, IEEE Transactions on On pp. 341-351, vol. 44, Issue: 3, Mar. 1996.*
Estimating local mean signal strength of indoor multipath propagation, Valenzuela, R.A.; Landron, O.; Jacobs, D.L. Vehicular Technology, IEEE Transactions on, On pp. 203-212, vol. 46, Issue: 1, Feb. 1997.*
A ray tracing approach to predicting Indoor Wireless Transmission; Valenzuela R A; IEEE 1993.*
"Web Enabling Applications" Brent Welch, Stephen Uhler, Fifth Annual Tcl/Tk Workshop USENIX, 1997, pp. 189-190 of the Proceedings (4 pg. printout from web).*
EETimes article "Cadence offers XML-based PCB library tool" by Michael Santarini, Published Apr. 24, 2000 12:11 PM EDT, pp. 1-4, http://www.eetimes.com/story/OEG20000424S0031.*
Article "Building Database Manipulator" Copyright, Jan. 1998; MPRG and Virginia Tech.
PCS 97 Track 7; Engineering & Systems Management; T. Rappaport. Propagator; vol. 8, No. 3; Fall 1997.
SMT Plus 1.0 User's Manual; R. Skidmore & T. Rappaport; Copyright, Aug. 1996 Virginia Tech.
Rappaport, T., et al,, Site Planner 3.0 User Manual, Wireless Valley Communications, Inc., 1998.
Benson, A., Client/Server Architecture, Mc-Graw Hill, Inc. 1992.
Site Planner 3.16 for Windows 95-98NT User's Manual, Wireless Valley Communications, Inc. Apr. 7, 1999.
Office Action in U.S. Appl. No. 10/807,388 dated Apr. 5, 2007.
Office Action in U.S. Appl. No. 10/807,388 dated Dec. 31, 2007.
Office Action in U.S. Appl. No. 10/807,388 dated Jun. 10, 2008.
Office Action in U.S. Appl. No. 11/329,126 dated Sep. 25, 2008.
Office Action in U.S. Appl. No. 11/329,126 dated Dec. 1, 2008.
Notice of Allowance issued in U.S. Appl. No. 11/329,126 dated Mar. 31, 2009.
Office Action in U.S. Appl. No. 11/186,929 dated Sep. 30, 2008.
Office Action in U.S. Appl. No. 11/186,929 dated Mar. 26, 2009.
Office Action in U.S. Appl. No. 11/697,557 dated Feb. 9, 2007.
Office Action in U.S. Appl. No. 11/697,557 dated Nov. 15, 2007.
Office Action in U.S. Appl. No. 11/697,557 dated Aug. 5, 2008.
Office Action in U.S. Appl. No. 11/697,557 dated Feb. 12, 2009.
Office Action in U.S. Appl. No. 11/176,668 dated Sep. 8, 2008.
Office Action in U.S. Appl. No. 11/176,668 dated Feb. 25, 2009.
Office Action in U.S. Appl. No. 10/266,711 dated Mar. 20, 2008.
Office Action in U.S. Appl. No. 10/266,711 dated Aug. 22, 2008.
Office Action in U.S. Appl. No. 10/266,711 dated Dec. 11, 2008.
Office Action in U.S. Appl. No. 11/405,167 dated Sep. 16, 2008.
Office Action in U.S. Appl. No. 11/405,167 dated Jan. 12, 2009.
Office Action in U.S. Appl. No. 11/184,841 dated Nov. 14, 2008.
Skidmore, "SMT Plus 1.0 user's manual", Aug. 1996, pp. 1-63.
Zhang, "Formulation of multiple diffraction by trees and buildings for radio propagation predictions for local multipoint distribution service", J. Res. Natl. Inst. Stand. Technol., 1999, pp. 579-585.
Fellner, D., "Radio wave propagation (CARPET)", Computer Graphics, Dept. of Computer Science, 1998, pp. 1-2.

Rappaport et al., "The future of wireless communications", MPRG, 1999, pp. 1-39.

Ulffe et al., "Measuring the 2.4 GHz Band for indoor wireless communications", Wireless design laboratory, 2000, pp. 1-14.

Hashemi, H., "The indoor radio propagation channel", IEEE. vol. 81, No. 7, Jul. 1993, pp. 943-961.

Liu et al., "Modelling microcellular radio wave propagation", IEEE, May 1996, pp. 1278-1282.

Fellner, et al., "MRT—A tool for simulations in 3D geometric domains", ESM, 1997, pp. 1-10.

Stamm et al., "A prototype system for light propagation in terrains", IEEE, 1998, pp. 1-5.

"EAC-50 Repeater System for In-Building Coverage", Installation and Operation Manual, Allen Telecom Company, 2000 (Referred to as EAC-50), pp. 1-16.

Rappaport, T.,et al., "Site Plannner 3.0, User's Manual", Wireless Valley Communications, Inc. 1998, pp. 1-186.

Bertoni, H.,et al., "UHF Propagation Prediction for Wireless Personal Communications", Proceeding of IEEE, vol. 82, No. 9, Sep. 1994, pp. 1333-1359.

Honcharenko, W., et al., "Mechanisms Governing UHF Propagation on Single Floors in Modern Office Buildings", IEEE Transactions on Vehicular Technology, vol. 41, No. 4, Nov. 1992, pp. 496-504.

"SMT Plus: Site Modeling Tool. A Software Tool for Planning Indoor Wireless Systems." 2001. Printed from http://www.mprg.org/research/smt/smt.shtml on Mar. 5, 2004, pp. 1-27.

"MPRG Industrial Affiliate Program." 2001 Printed from http://www.mprg.org/partnerships/affiliate.shtml on Mar. 5, 2004.

"Wireless Research Leads to Indoor Planning Tool," EE Connection, Feb. 1997. Printed from http://w.ecpe.vt.edu/ecenews/feb97/smt.html on Mar. 5, 2004.

"VTIP Disclosure No. 96-013." Virginia Tech Intellectual Properties, Inc. 1997-2001. Printed from http://www.vtip.org/licensing/disclosures/96-0 3.htm on Mar. 5, 2004.

"Communication Products Special Section." EDN Access, Aug. 1, 1996. Printed from http://www.e-insite.net/ednmag/archives/1996/080196/16dfl.htm on Mar. 5, 2004.

Panjwani et al., "Interactive Computation of Coverage Regions for Wireless Communication in Multifloored Indoor Environments." IEEE Journal of Selected Areas in Communication. Apr. 1996. pp. 420-430.

Skidmore et al. "Interactive Coverage Region and System Design Simulation for Wireless Communication Systems in Multifloored Indoor Environments: SMT Plus." 5th Int'l Conference on Universal Personal Communications, Sep. 29-Oct. 2, 1996. pp. 646-650.

Skidmore et at. "A Comprehensive In-Building and Microcellular Wireless Communication System Design Tool." The Bradley ,- Dept. of Electrical Engineering, Virginia Tech Univ. MPRG-TR-97-13. Jun. 1997, pp. 1-2.

Valenzuela, R A., "A ray tracing approach to predicting Indoor Wireless Transmission", IEEE 1993, pp. 214-218.

Santarini, M., EETimes article "Cadence offers XML-based PCB library tool", Published Apr. 24, 2000, pp. 1-4, http://www.eetimes.com/story/OEG20000424S0031.

Welch, B.,et all., "Web Enabling Applications" Fifth Annual Tcl/Tk Workshop USENIX, 1997, pp. 189-190 of the Proceedings (4 pg. printout from web).

Website "WiSE Design of Indoor & Outdoor Wireless Systems"—http://web.archive.org/webI200212190834211 www.belllabs.comlorglwireless1wisext.html—Dec. 2002.

Fortune, S.,et al., "WISE design of indoor wireless systems: practical computation and optimization", Publication. Date: Spring 1995 vol. 2 , Issue: 1 pp. 58-68.

Hansen, W., "Rendering Tcl/TK windows as HTML"; Mar. 5, 2003—Carnegie Mellon University.

Landron, O, et al., "A comparison of theoretical and empirical reflection coefficients for typical exterior wall surfaces in a mobile radio environment, Antennas and Propagation", IEEE Transactions pp. 341-351, vol. 44, Issue: 3, Mar. 1996.

Valenzula, R., et al., "Estimating local mean signal strength of indoor multipath propagation", Vehicular Technology, IEEE Transactions , pp. 203-212, vol. 46, Issue: 1, Feb. 1997.

Skidmore et al. "Towards Integrated PSEs for Wireless Communications: Experiences with the S4W and SitePlanner Projects". Oct. 28, 2003, pp. 20-34.

Skidmore. et al. "Towards Integrated PSEs for Wireless Communications: Experiences with the S4W and SitePlanner Projects". ACM SIGMOBILE Mobile Computing and Communications Review. vol. 8, Issue 2. Apr. 2004. pp. 20-34.

EDX, "Mircocell/Indoor Module", Apr. 2000. p. 1-63.

Trademark, "Siteplanner" 1999. p. 1.

Newhall, W.G., "Wideband Propagation Measurement Results, Simulation Models, and Processing Techniques for a Sliding Correlator Measurement System". Dissertation. p. 1-159, Copyright 1997.

Rappaport, T.S., "Last-Mile Wireless Propagation Modeling, Measurment, & Prediction" HP. 1998. p. 1-20.

EDX Data File Format Specifications. Jul. 2001 p. 1-24.

Borst, S., et al., "Wireless Simulation and Self-organizing Spectrum Management" Bell Labs Technical Journal. 1997 p. 81-98.

Cambridge Research Associates: "Synthetic Vision Systems" 1999 p. 1-31.

Huang, Y.P., "Triangular Irregular Network Generation and Topographical Modeling", 1989 Computers-In-Industry. vol. 12, No. 3, p. 203-213.

\* cited by examiner

*Primary Examiner*—Kamini S Shah
*Assistant Examiner*—Akash Saxena
(74) *Attorney, Agent, or Firm*—Ingrassia, Fisher & Lorenz, P.C.

(57) ABSTRACT

A computerized model provides a display of a physical environment in which a communications network is or will be installed. The communications network is comprised of several components, each of which are selected by the design engineer and which are represented in the display. Errors in the selection of certain selected components for the communications network are identified by their attributes or frequency characteristics as well as by their interconnection compatibility for a particular design. The effects of changes in frequency on component performance are modeled and the results are displayed to the design engineer. A bill of materials is automatically checked for faults and generated for the design system and provided to the design engineer. For ease of design, the design engineer can cluster several different preferred components into component kits, and then select these component kits for use in the design or deployment process.

32 Claims, 22 Drawing Sheets

Antenna Position Mode Prediction Control

CDMA1 AllenTel dB omni PCN 1850-1990 360Deg 6.00 dB Gain

Watch Points

1-Floor1, 67.71, 3.83, 1.80
2-Floor1, 54.11, 25.25, 1.80
3-Floor 1, 33.67, 24.34, 1.80
4-Floor1, 33.46, 8.05, 1.80

[ Add Watch Point ]   [ Remove Watch Point ]

Floor [ 1 ▼ ]

Mobile Receiver Parameters

Predict
⦿ RSSI      ○ SIR      ○ SNR

Antenna Positioning Options
⦿ Left Click on Location      ○ Track Mouse Movement

[ OK ]   [ Cancel ]

FIG.12

```
┌─────────────────────────────────────────────────────┐
│  Bill of Materials for Current Drawing         ⊠    │
├─────────────────────────────────────────────────────┤
│ |                                                   │
│ |                                                   │
│ | SUBTOTAL (excluding base station CDMA1): $0.00    │
│ |─────────────────────────────────────────────      │
│ | BASE STATION: MACROCELL                           │
│ | DESCRIPTION: CDMA MACROCELL                       │
│ | FLOOR1                                            │
│ | POSITION: 84.3, 44.0, 1.8                         │
│ | CHANNEL SET: MACROCELL: IS-95A CDMA Default       │
│ | SUBCHANNEL SET: Default Channel Set               │
│ | TXPOWER: 10.00 dBm                                │
│ | RF Bandwidth: 1.25 MHz                            │
│ | RECEIVER NOISE FIGURE: 0.00 dB                    │
│ | CHANNELS ASSIGNED TO BASE STATION                 │
│ |  |                                                │
│ |                                                   │
│ |--NAME: AllenTel PCN PANEL 1710-1990 92 Deg 9.00 dB Gain │
│ |   TYPE: ANTENNA_POINT                             │
│ |   MANUFACTURER: Allen Telecom                     │
│ |   PART NUMBER: DB972 1850                         │
│ |   FREQUENCY: 1710-1990 MHz                        │
│ |   PATTERN FILE: 972_185.ant                       │
│ |   FLOOR1                                          │
│ |   POSITION: 84.3, 44.0, 1.8                       │
│ |   COST: $0.00 ～ 1612                             │
│ |                                                   │
│ |                                                   │
│ | SUBTOTAL (excluding base station MACROCELL): $0.00 ～1613 │
│ | TOTAL COST(excluding base stations): $0.00 ～1614 │
├─────────────────────────────────────────────────────┤
│         Save to ASCII File              ok          │
└─────────────────────────────────────────────────────┘
```

- 1610: BASE STATION block (MACROCELL ... CHANNELS ASSIGNED TO BASE STATION)
- 1611: Antenna block (NAME: AllenTel PCN PANEL ... COST: $0.00)

FIG. 16

Bill of Materials for Current Drawing

1611 {
```
| TYPE: ANTENNA_POINT
| MANUFACTURER: Allen Telecom
| PART NUMBER: DB972 1850
| FREQUENCY: 1710-1990 MHz
| PATTERN FILE: 972_185.ant
| FLOOR1
| POSITION 84.3, 44.0, 1.8
| COST: $250.00           ~— 1612a
```
}

1720 {
```
|--NAME:7/8", 50-ohm Foam Dielectric Coaxial Cable"
|   TYPE: CABLE
|   MUNUFACTURER: Andrew
|   PART NUMBER: LDF5*
|   FREQUENCY: 2000MHz
|   LENGTH: 120.41 m (395.06ft)
|   LOSS PER 100 m: 6.46 dB
|   TOTAL LOSS: 7.78 dB
|   POSITION:
|   Vertex0: 10.6, 0.8, 1.8
|   Vertex1: 1.7, 2.8, 1.8
|   Vertex2: 1.7, 31.0, 1.8
|   Vertex3: 35.3, 31.0, 1.8
|   Vertex4: 35.3, 23.5, 1.8
|   Vertex5: 65.4, 23.6, 1.8
|   Vertex6: 72.6, 32.0, 1.8
|   COST: $85.00    ~— 1721
|
| SUBTOTAL(excluding base station MACROCELL): $470.00 ~— 1613a
```
}

TOTAL COST(excluding base stations): $470.00 ~— 1614a

[ Save to ASCII File ]    [ ok ]

FIG.17

METHOD AND SYSTEM, WITH COMPONENT KITS, FOR DESIGNING OR DEPLOYING A COMMUNICATIONS NETWORK WHICH CONSIDERS FREQUENCY DEPENDENT EFFECTS

CROSS-REFERENCE TO RELATED APPLICATIONS

This application is related to the U.S. patent application Ser. No. 09/352,678 filed Jul. 14, 1999, now U.S. Pat. No. 6,499,006; Ser. No. 09/318,840 filed May 26, 1999, now U.S. Pat. No. 6,317,599; Ser. No. 09/318,841 filed May 26, 1999; and Ser. No. 09/318,842 filed May 26, 1999, now U.S. Pat. No. 6,493,679; and is also related to the concurrently filed applications having U.S. Ser. No. 09/632,853, entitled "Method and System for Designing or Deploying a Communications Network which Considers Component Attributes"; and is a divisional of U.S. Ser. No. 10/606,115 filed Jun. 26, 2003 now U.S. Pat. No. 7,171,208 entitled "Method and System, with Component Kits for Designing or Deploying a Communications Network which Allows the Simultaneous Selection of Multiple Components", which itself is a continuation of U.S. Ser. No. 09/633,121, now U.S. Pat. No. 6,625,454, all of which are assigned to a common assignee, and the subject matter of these applications is incorporated herein by reference.

BACKGROUND OF THE INVENTION

1. Field of the Invention

The present invention generally relates to engineering and management systems for the design of communications networks (both wireless and wired) and, more particularly, to a system and method for managing a real time bill of materials when designing, evaluating or optimizing the performance and/or costs of a communication system using a three-dimensional (3-D) representation of the environment. The present invention provides the design engineer with the ability to (1) group components together as a single connected or unconnected unit or "component kit" to simplify selection and assembly of hardware components, (2) have at his or her disposal in the Parts List Library performance parameters for selected components which are associated with the signal or "frequency" which will pass through the component such that electromechanical properties of the components can be considered on a frequency dependent basis automatically by the system, and (3) have at his or her disposal attributes which are associated with specific components in the Parts List Library which, acting in concert with real-time smart processing, provide the design engineer with notifications or warnings when he or she has proposed connections, components, or other arrangements which will not operate correctly in the communications network.

2. Background Description

As wireless communications use increases, radio frequency (RF) coverage within buildings and signal penetration into buildings from outside transmitting sources has quickly become an important design issue for wireless engineers who must design and deploy cellular telephone systems, paging systems, or new wireless systems and technologies such as personal communication networks or wireless local area networks. Designers are frequently requested to determine if a radio transceiver location, or base station cell site can provide reliable service throughout an entire city, an office, building, arena or campus. A common problem for wireless systems is inadequate coverage, or a "dead zone," in a specific location, such as a conference room. It is now understood that an indoor wireless PBX (private branch exchange) system or wireless local area network (WLAN) can be rendered useless by interference from nearby, similar systems. The costs of in-building and microcell devices which provide wireless coverage within a 2 kilometer radius are diminishing, and the workload for RF engineers and technicians to install these on-premises systems is increasing sharply. Rapid engineering design and deployment methods for microcell and in-building wireless systems are vital for cost-efficient build-out.

Analyzing radio signal coverage penetration and interference is of critical importance for a number of reasons. A design engineer must determine if an existing outdoor large scale wireless system, or macrocell, will provide sufficient coverage throughout a building, or group of buildings (i.e., a campus). Alternatively, wireless engineers must determine whether local area coverage will be adequately supplemented by other existing macrocells, or whether indoor wireless transceivers, or picocells, must be added. The placement of these cells is critical from both a cost and performance standpoint. If an indoor wireless system is being planned that interferes with signals from an outdoor macrocell, the design engineer must predict how much interference can be expected and where it will manifest itself within the building, or group of buildings. Also, providing a wireless system that minimizes equipment infrastructure cost as well as installation cost is of significant economic importance. As in-building and microcell wireless systems proliferate, these issues must be resolved quickly, easily, and inexpensively, in a systematic and repeatable manner.

There are many computer aided design (CAD) products on the market that can be used to design the environment used in one's place of business or campus. WiSE from Lucent Technology, Inc., SignalPro from EDX, PLAnet by Mobile Systems International, Inc., and TEMS and TEMS Light from Ericsson are examples of wireless CAD products. In practice, however, a pre-existing building or campus is designed only on paper and a database of parameters defining the environment does not readily exist. It has been difficult, if not generally impossible, to gather this disparate information and manipulate the data for the purposes of planning and implementation of indoor and outdoor RF wireless communication systems, and each new environment requires tedious manual data formatting in order to run with computer generated wireless prediction models. Recent research efforts by AT&T Laboratories, Brooklyn Polytechnic, and Virginia Tech, are described in papers and technical reports entitled "Radio Propagation Measurements and Prediction Using Three-dimensional Ray Tracing in Urban Environments at 908 MHZ and 1.9 GHz," (*IEEE Transactions on Vehicular Technology*, VOL. 48, No. 3, May 1999), by S. Kim, B. J. Guarino, Jr., T. M. Willis III, V. Erceg, S. J. Fortune, R. A. Valenzuela, L. W. Thomas, J. Ling, and J. D. Moore, (hereinafter "Radio Propagation"); "Achievable Accuracy of Site-Specific Path-Loss Predictions in Residential Environments," (*IEEE Transactions on Vehicular Technology*, VOL. 48, No. 3, May 1999), by L. Piazzi and H. L. Bertoni; "Measurements and Models for Radio Path Loss and Penetration Loss In and Around Homes and Trees at 5.85 Ghz," (*IEEE Transactions on Communications*, Vol. 46, No. 11, November 1998), by G. Durgin, T. S. Rappaport, and H. Xu; "Radio Propagation Prediction Techniques and Computer-Aided Channel Modeling for Embedded Wireless Microsystems," ARPA Annual Report, MPRG Technical Report MPRG-TR-94-12, July 1994, 14 pp., Virginia Tech, Blacksburg, by T. S. Rappaport, M. P. Koushik, J. C. Liberti, C. Pendyala, and T. P. Subramanian; "Radio Propagation Prediction Techniques and Computer- Aided Channel Modeling for Embedded Wireless Microsystems," MPRG Technical Report MPRG-TR-95-08, July 1995, 13 pp., Virginia Tech, Blacksburg, by T. S. Rappaport, M. P. Koushik, C. Carter, and M. Ahmed; "Use of Topographic Maps with Building Information to Determine Antenna Placements and GPS Satellite Coverage for Radio Detection & Tracking in Urban Environments," MPRG Technical Report MPRG-TR-95-14, Sep. 15, 1995, 27 pp., Virginia Tech, Blacksburg, by T. S. Rappaport, M. P. Koushik, M. Ahmed, C. Carter, B. Newhall, and N. Zhang; "Use of Topographic Maps with Building Information to Determine Antenna Placement for Radio Detection and Tracking in Urban Environments," MPRG Technical Report MPRG-TR-95-19, November 1995, 184 pp., Virginia Tech, Blacksburg, by M. Ahmed, K. Blankenship, C. Carter, P. Koushik, W. Newhall, R. Skidmore, N. Zhang and T. S. Rappaport; "A Comprehensive In-Building and Microcellular Wireless Communications System Design Tool," MPRG-TR-97-13, June 1997, 122 pp., Virginia Tech, Blacksburg, by R. R. Skidmore and T. S. Rappaport; "Predicted Path Loss for Rosslyn, Va.," MPRG-TR-94-20, Dec. 9, 1994, 19 pp., Virginia Tech, Blacksburg, by S. Sandhu, P. Koushik, and T. S. Rappaport; "Predicted Path Loss for Rosslyn, Va., Second set of predictions for ORD Project on Site Specific Propagation Prediction" MPRG-TR-95-03, Mar. 5, 1995, 51 pp., Virginia Tech, Blacksburg, by S. Sandhu, P. Koushik, and T. S. Rappaport. These papers and technical reports are illustrative of the state of the art in site-specific propagation modeling and show the difficulty in obtaining databases for city environments, such as Rosslyn, Va. While the above papers describe a research comparison of measured vs. predicted signal coverage, the works do not demonstrate a systematic, repeatable and fast methodology for creating an environmental database, nor do they report a method for analyzing system performance or visualizing and placing various wireless equipment components that are required to provide signals in the deployment of a wireless system in that environment.

While there are many methods available for designing wireless networks that provide adequate coverage, there is no easy method to ensure that the system will be cost effective. For instance, even though the coverage may be more than adequate, given the chosen wireless infrastructure components, the total cost of the system could be prohibitive.

SUMMARY OF THE INVENTION

It is an object of the invention to provide a rapid and automated method for generating a bill of materials and cost information in real time, as components for a desired wireless communication system are specified and/or replaced by substitute components, while continuously predicting wireless system performance. This automatic method for comparing the cost and performance of competing products or competing design methodologies, in real time, offers a significant value for wireless engineers and provides a marked improvement over present day techniques.

It is another object of this invention to provide a communications design engineer with a software tools which allow him or her to (1) group components together as a single unit or "component kit" to simplify selection and assembly of hardware components, (2) have at his or her disposal in the Parts List Library performance parameters for selected components which are associated with the signal or "frequency" which will pass through the component such that electromechanical properties of the components can be considered on a frequency dependent basis either automatically or through the use of a prompt (i.e., these being "frequency dependent characteristics"), and (3) have at his or her disposal attributes which are associated with specific components in the Parts List Library which, acting in concert with real-time smart processing, provide the design engineer with notifications or warnings when he or she has proposed connections, components, or other arrangements which will not operate correctly in the communications network.

According to the invention, a design engineer builds a model of the desired wireless communications system and specifies each component necessary to provide sufficient or optimal system performance. A parts list is maintained, in real time, that contains a definition of each system component and its associated performance and cost parameters. Using this method, the user is able to rapidly change the physical location of components within the wireless system in order to investigate alternative designs which may use different components, such as antennas and cables; or use different RF distribution methods and/or various types of coaxial or optical splitter systems, etc. Cost parameters include both component costs and installation costs. As the system is changed through a series of "what-if" scenarios, components are replaced with substitute components, cable lengths are modified, antenna systems and base stations are re-positioned to alternate locations, etc.

Each time a component is added to or deleted from the system model, the bill of materials is automatically updated and component costs, total costs, and altered system performance specifications are immediately available to the design engineer. The designer may choose to swap components for less expensive components. The performance characteristics of the system are automatically updated as cost choices are made to enable the designer to assess the changes in performance and cost at the same time.

The communications design engineer may group several components together into a collection referred to as a "component kit". Thereafter, he or she will need only select the "component kit" for inclusion in the computerized representation of the physical environment in which the communications network will be installed. These "component kits" could be custom designed by the design engineer or, alternatively, the software package included in this system could have preselected components bundled as a "component kit". The "component kits" allow the design engineer to more simply and quickly prepare models of the communications network since he or she will be able to select essentially bundles of communications components at a time. The system; however, will be able to track all the attributes of all the components in the selected component kits, including all performance attributes, pricing information, and other physical attributes and maintenance schedules, such that calculations will automatically consider the performance criteria, pricing and compatibility for the system designed by the engineer. The component kits may be assembled in the same manner as an actual communication system, including the associated cabling and distribution system, so that connections between components are already set up when the kit is added into a system; this saves a great deal of time for the engineer.

Various attributes of components will be associated with specific components in the Parts List Library, such as, for example, whether a component is an optical component or one which requires radio signals. As another example, the length of cable in which a signal can propagate without unacceptable deterioration may be associated with the cable in the parts list library. These attributes will be considered automatically by the system of this invention such that when a design engineer attempts to model connected components which are not properly connectable in the physical world, or when he or she attempts to use too long a cable length, etc., the system will provide a warning that the system being designed will be inoperative or be otherwise flawed. This will allow the designer to immediately recognize errors in design and correct for them during the design phase. Without such a facility, errors may not be discovered until installation or use of the system, at which point they are far more costly to repair.

Frequency dependent characteristics will also be associated with individual components in the Parts List Library. This will allow the design engineer to automatically consider the effects of signal frequency on the electrical performance of the designed communications network. This feature is especially valuable in light of the fact that most of said components are specifically designed to function in multiple frequency bands, with varying performance with respect to frequency.

BRIEF DESCRIPTION OF THE DRAWINGS

The foregoing and other objects, aspects and advantages will be better understood from the following detailed description of a preferred embodiment of the invention with reference to the drawings, in which:

FIG. 12 shows a dialog box displaying the locations of the selected watch points and choices for display information;

FIG. 16 shows a bill of materials summary for a drawing, according the preferred embodiment of the invention;

FIG. 17 shows a bill of materials summary for a drawing after costs have been added to a database, according the preferred embodiment of the invention;

DETAILED DESCRIPTION OF A PREFERRED EMBODIMENT OF THE INVENTION

Design of Wireless Communication Systems

Using the present method, it is now possible to assess the RF environment in a systematic, organized fashion by quickly viewing signal strength, or interference levels, or other wireless system performance measures. The current embodiment is designed specifically for use with the SitePlanner™ suite of products available from Wireless Valley Communications, Inc. of Blacksburg, Va. However, it will be apparent to one skilled in the art that the method could be practiced with other products either now known or to be developed in the future. (SitePlanner is a trademark of Wireless Valley Communications, Inc.)

Figure 1:
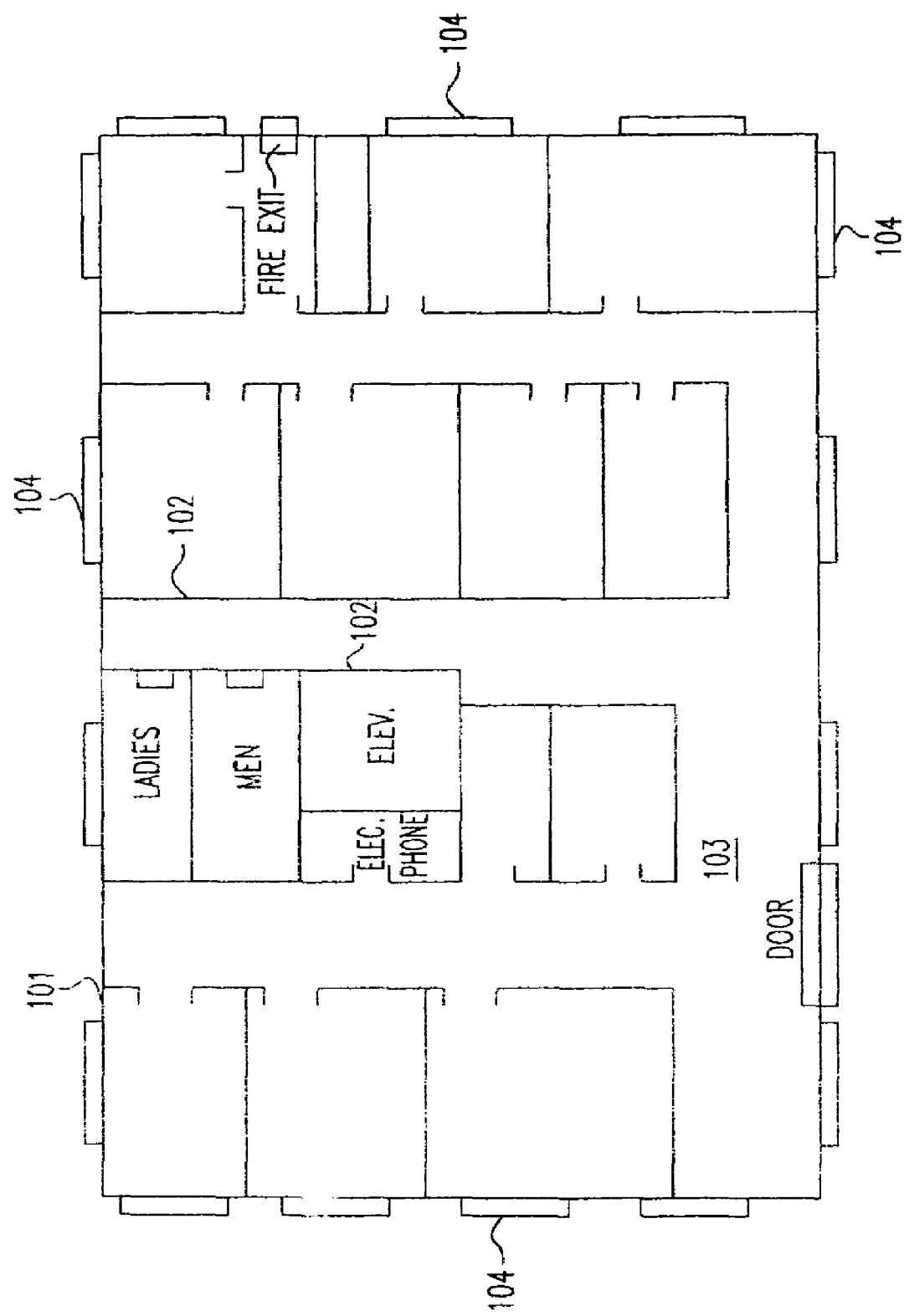
FIG. 1 shows an example of a simplified layout of a floor plan of a building.

Referring now to FIG. 1, there is shown a two-dimensional (2-D) simplified example of a layout of a building floor plan. The method uses 3-D computer aided design (CAD) renditions of a building, or a collection of buildings and/or surrounding terrain and foliage. However, for simplicity of illustration a 2-D figure is used. The various physical objects within the environment such as external walls 101, internal walls 102 and floors 103 are assigned appropriate physical, electrical, and aesthetic values. For example, outside walls 101 may be given a 10 dB attenuation loss, signals passing through interior walls 102 may be assigned 3 dB attenuation loss, and windows 104 may show a 2 dB RF penetration loss. In addition to attenuation, the obstructions 101, 102 and 103 are assigned other properties including reflectivity and surface roughness.

Estimated partition electrical properties loss values can be extracted from extensive propagation measurements already published, which are deduced from field experience, or the partition losses of a particular object can be measured directly and optimized instantly using the present invention combined with those methods described in the copending application Ser. No. 09/221,985, entitled "System for Creating a Computer Model and Measurement Database of a Wireless Communication Network" filed by T. S. Rappaport and R. R. Skidmore. Once the appropriate physical and electrical parameters are specified, any desired number of hardware components of RF sources can be placed in the 3-D building database, and received signal strengths (RSSI), network throughput, bit or frame or packet error rate, network delay, or carrier-to-interference (C/I), carrier-to-noise (C/N), or chip energy to interference (Ec/Io) ratios can be plotted directly onto the CAD drawing. The 3-D environment database could be built by a number of methods, the preferred method being disclosed in the concurrently filed, copending application Ser. No. 09/318,841. Traffic capacity analysis, frequency planning, co-channel interference analysis can be performed in the invention along with RF coverage. Other system performance metrics may be easily incorporated by one skilled in the art through well known equations.

Figure 2:
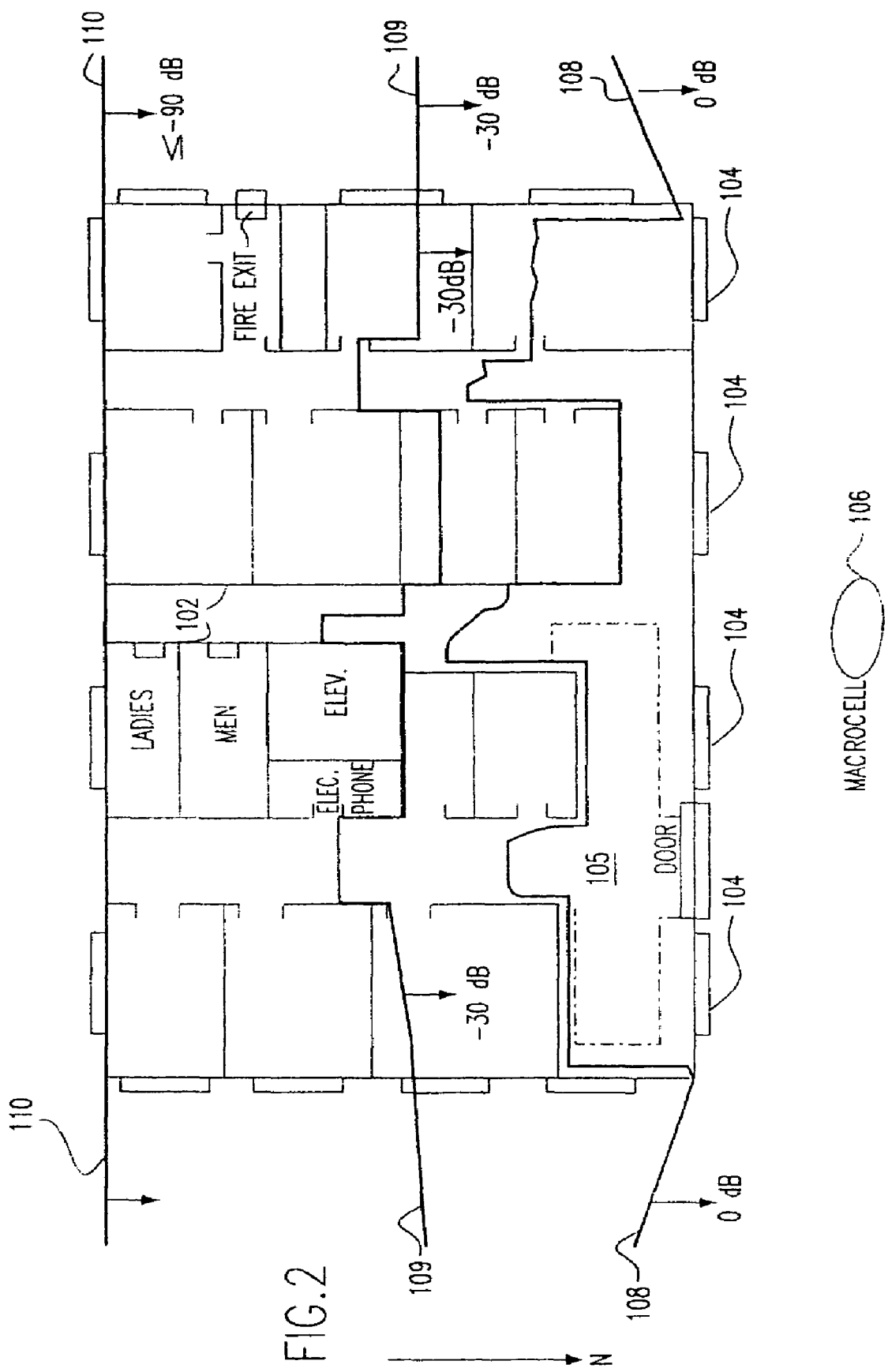
FIG. 2 shows effective penetration of Radio Frequency (RF) transmission into a building from a macrocell.

FIG. 2 depicts effective RF penetration into the building from the distant macrocell using a close-in virtual macrocell transmitting into the lossless distributed antenna.

Referring to FIG. 2, there are several windows 104, and even a large glass foyer 105, on the north wall of the building, so RF penetration into this part of the building is quite good, as shown by contour lines 108 and 109 for 0 dB and −30 dB, respectively. Even so, interior walls 102 cause signal levels in some areas to drop below a minimum useable signal strength of about −90 dBm, especially in some of the southern rooms, as shown by contour line 110. Consequently, macrocell coverage there will probably be poor.

Other outdoor macrocells can be modeled in the same way, and their signal strength contours plotted, to determine if hand-offs can compensate for the inadequacies of the macrocell north of the building. If not, then indoor picocells (and their distributed feed systems, antennas, and antenna patterns) can be easily added if necessary, and their performance checked using the method, to complement coverage provided by the macrocells.

The mathematical propagation models used to predict and optimize antenna positioning in a desired environment may include a number of predictive techniques models, such as those described in the previously cited and following technical reports and papers: "Interactive Coverage Region and System Design Simulation for Wireless Communication Systems in Multi-floored Indoor Environments, SMT *Plus*," *IEEE ICUPC '96 Proceedings*, by R. R. Skidmore, T. S. Rappaport, and L. Abbott which is hereby incorporated by reference. Some simple models are also briefly described in "SitePlanner 3.16 for Windows 95/98/NT User's Manual" (Wireless Valley Communications, Inc. 1999), hereby incorporated by reference. It would be apparent to one skilled in the art how to apply other system performance models to this method.

Interference, instead of radio signal strength, is the dominant performance-limiting factor in many situations due to increased wireless communications use. Modeling interference from any source to an established or contemplated wireless system is straightforward using the method. Suppose, for example, that an indoor wireless communication system is assigned a frequency set identical to that of an outdoor wireless system. Although the indoor system may provide sufficient RSSI throughout its coverage area, interference from the outside system may still render the indoor wireless system ineffectual in certain parts of the building.

Caution must be used, however, when modeling and analyzing interference, since the detrimental effect may also depend upon technologies and/or signal processing technologies, not just signal power levels. For example, a geographic area could have similar narrowband and/or wideband in the 800 MHZ cellular bands, for instance with Advanced Mobile Phone System (AMPS) and Code Division Multiple Access (CDMA) systems, but users using either technology may be able to coexist if their respective demodulation processes reject interference provided by the undesired system. The current embodiment of this invention allows the user to select the air interface/technology being used by the wireless system being designed and automatically adjusts the prediction of interference accordingly.

Figure 3:
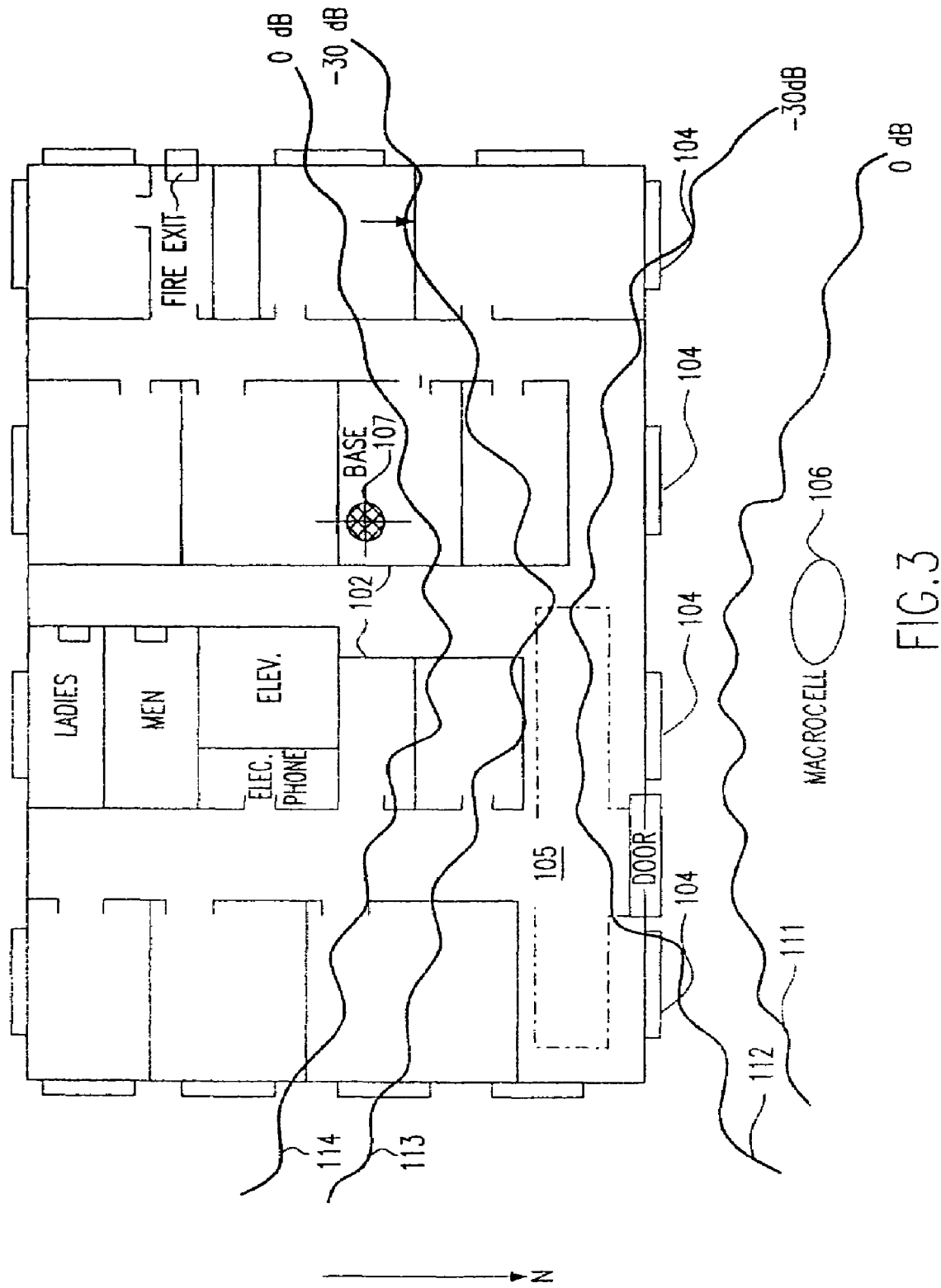
FIG. 3 shows a simplified layout of a floor plan of a building including an outdoor macrocell and an indoor base station.

FIG. 3 shows another rendition of the office building example, but an indoor wireless system 107 has been added. In this example, 800 MHZ AMPS technology is assigned to both transmitters 106 and 107. Differing wireless standards and technologies such as CDMA and Global System Mobile (GSM) could have been selected as well. The present invention uses a database to represent the exact physical air interface standards of a wide range of technologies and may be easily edited for future interface standards. As new technologies are developed, one skilled in the art could easily modify this invention to include the new technologies.

The outdoor wireless system 106 is now interfering with the indoor network, and the effect is checked by plotting C/I contours 111 and 112 at 0 dB and −30 dB, respectively, for the outdoor system and also plotting C/I contours 113 and 114 at 0 dB and −30 dB for the indoor system. The 0 dB contour 114 shows where the desired and interfering signal levels are equal, so the interfering outdoor system's signal predominates in areas outside this contour. It is obvious that the indoor network is rendered useless throughout many parts of the building. There are a number of possible solutions that may be analyzed by a designer using the present invention.

One solution is to change the indoor system's antenna location or increase the transmitted power, add more nodes, or select a different frequency set. These changes may be made with the simple click of a mouse in the method of the invention, so that new channel sets, antenna locations, or alternative antenna systems (such as in-building distributed systems, directional antennas, or leaky feeders) may be evaluated quickly, thereby eliminating guesswork and/or costly on-site experimentation with actual hardware. Instead of displaying contours of coverage or interference, the present invention also allows the user to specify fixed or moveable watch points that indicate or display predicted performance in extremely rapid fashion at specific points in the environment.

Figure 4:
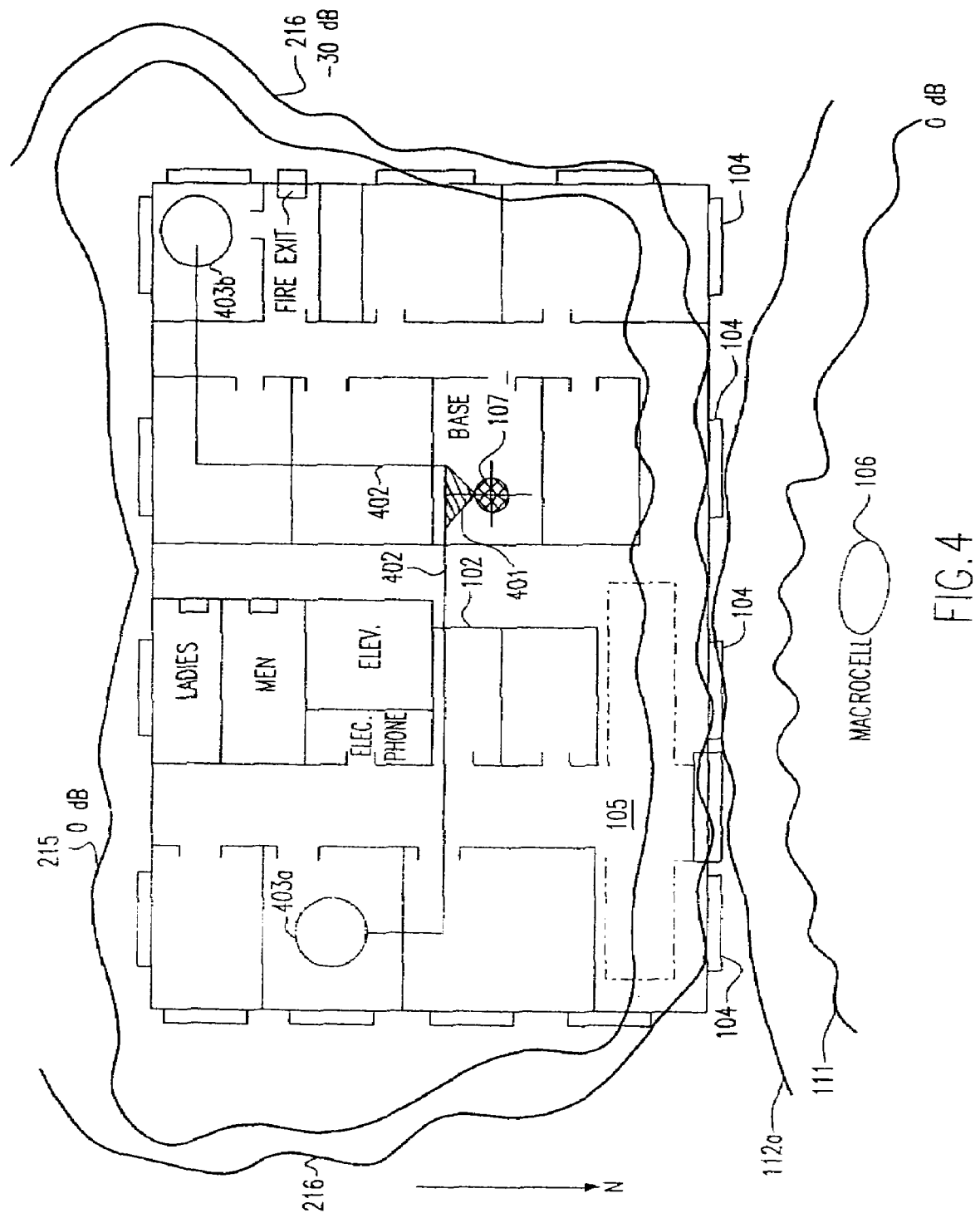
FIG. 4 shows the layout of FIG. 3, but with a revised base station designed to eliminate interference.

For example, FIG. 4 illustrates how the same indoor wireless system of FIG. 3 can provide adequate C/I protection when connected to a distributed indoor antenna system consisting of a two-way splitter 401 (3 dB loss+insertion loss) and two 40 foot cable runs 402 to popular commercial indoor omnidirectional antennas 403. A look at the new 0 dB contour lines 111 and 215, and −30 dB contour lines 112a and 216 show that the coverage inside the building is now adequate; the outdoor system 106 no longer causes significant interference in most parts of the building. Watch points allow a user to instantly determine spot coverage or other system performance without having to wait for the computation and display of contour plots.

The method allows any type of distributed antenna system to be modeled within seconds, while continuously monitoring and analyzing the component and installation cost and resulting link budget, as disclosed below, enabling "what-if" designs to be carried out on the fly with minimum guess work and wasted time. It is clear that while an RF system is shown and described herein, the same concepts may be applied to any communications network, with a wide range of distribution methods and components.

In the present embodiment of the invention, the designer identifies locations in the 3-D environmental database where certain levels of wireless system performance are desirable or critical. These locations, termed "watch points", are points in three-dimensional space which the designer identifies by visually pointing and/or clicking with a mouse or other input device at the desired location in the 3-D environmental database. Any number of such watch points may be placed throughout the 3-D environment at any location. Watch points may be designated prior to performing a performance prediction on a given wireless communication system, or may be dynamically created by the user at any time during the course of a wireless system performance calculation using the same point and click technique described above.

Watch points provide graphical and/or textual feedback to a designer regarding the wireless system performance throughout the environment. Depending on the type of visual feedback desired by the designer, watch points may take the form of one or more of the following:

A computed number displayed as text that represents received signal strength (RSSI), signal-to-interference ratio (SIR), signal-to-noise ratio (SNR), frame error rate (FER), bit error rate (BER), or other wireless system performance metrics;

A small region of solid color whose shade and/or tint varies relative to some computed wireless system performance metric;

Colored lines linking the watch point location with the location one or more antennas in the wireless communication system, where the color, thickness, and/or other physical aspect of the connecting line varies relative to some computed wireless system performance metric and dependent upon whether the forward or reverse wireless system channel is being analyzed;

Other form designated by the designer; or

Any combination of the above.

In all cases, the graphical and/or textual representation of each watch point is updated in real-time as a result of the instantaneous computation of the wireless system performance metrics, which are linked to the 3-D environmental database, and initiated due to dynamic changes being made to the wireless system configuration and/or watch point position itself by the user. For example, if the user repositions an antenna using the mouse or other input device, the effect of doing so on the overall wireless system performance is computed and the results are displayed via changes in the appearance of watch points. In addition, numerical values predicted at the watch points are displayed in summary in a dialog window and written to a text file for later analysis. This process is described in greater detail in the following sections.

The preferred embodiment of the invention utilizes a 3-D environmental database containing information relevant to the prediction of wireless communication system performance. This information includes but is not limited to the location, and the physical and electromagnetic properties of obstructions within the 3-D environment, where an obstruction could be any physical object or landscape feature within the environment (e.g., walls, doors, windows, buildings, trees, terrain features, etc.), as well as the position and physical and electrical properties of communications hardware to be used or simulated in the environment.

The designer identifies the location and type of all wireless communication system equipment within the 3-D environmental database. This point-and-click process involves the designer selecting the desired component from a computer parts database and then visually positioning, orienting, and interconnecting various hardware components within the 3-D environmental database to form complete wireless communication systems. The preferred embodiment of the computer parts database is more fully described below. The resulting interconnected network of RF hardware components (commonly known as a wireless distributed antenna) is preferably assembled using either a drag and drop technique or a pick and place and is graphically displayed overlaid upon the 3-D environmental database, and utilizes electromechanical information available for each component via the parts list library in order to fully describe the physical operating characteristics of the wireless communication system (e.g., the system noise figure, antenna radiation characteristics, frequencies, etc.). This information is directly utilized during the prediction of wireless system performance metrics and is discussed later.

The present invention represents a dramatic improvement over prior art by providing the design engineer with instant feedback on wireless system performance metrics as the user alters the physical location of switches, routers, repeaters, transducers, couplers, transmitters, receivers, and other components described elsewhere or which would be known by those of skill in the art, or otherwise modifies the antenna system. The current embodiment utilizes the concept of watch points to implement this. Multiple methods of display and a wide range of settings are available for the designer to use in optimizing antenna placement based upon wireless system performance values displayed at each watch point. One skilled in the art could see how watch points as they are herein described could apply to different implementations as well. Descriptions of the different techniques implemented in the current invention are provided in the following sections.

One form of the method allows the designer to dynamically alter the position, orientation, and/or type of any hardware component utilized within a wireless communication system modeled in a 3-D environmental database. Using this technique, the designer may identify watch points representing critical areas of the 3-D environment that require a certain level of wireless system performance. Such areas could include the office of the Chief Executive Officer (CEO) of a company, a conference room, a city park, or the office of a surgeon on call. Next the designer selects the component of interest within the wireless system. In the present invention, this would be the selection of an antenna or leaky feeder antenna, for example, but one skilled in the art could see that this could be any physical antenna system component. Once the desired hardware component is selected, the designer may begin making changes to the state of the component. For example, by moving the mouse or other input device cursor, the user could effectively relocate the selected component to another position in the 3-D environmental database. This involves the user visually moving the mouse cursor, in real-time, such that the cursor resides in another portions of the 3-D database. The present invention recalculates wireless system performance based upon RSSI, SIR, SNR, FER, BER, or other metric, incorporating the user's desired change in the position of the selected component.

The calculations combine the electromechanical properties of each component in the wireless communication system (e.g., noise figure, attenuation loss or amplification, antenna radiation pattern, etc.), the electromagnetic properties of the 3-D environmental database, and radio wave propagation techniques (detailed later) to provide an estimate of the wireless system performance. Calculations are performed at each watch point the user has identified, and the graphical display of the watch point is updated to reflect the result of the calculations.

As the user moves the mouse cursor and effectively repositions the selected component, the overall performance of the wireless communication system may be altered. For example, if the selected component is an antenna, repositioning the antenna changes the origination point of radio wave signals being broadcast from the antenna, and can thus dramatically change the reception of adequate RF signal throughout the environment. Because the graphical display of the watch points is updated in real-time as the selected component is repositioned, the designer is provided instant feedback on the revised wireless system performance, and can make design decisions based upon the viability of multiple proposed locations and/or wireless system configurations rapidly. While many of the concepts discussed above deal with wireless networks, one of ordinary skill in the art would understand that similar features may be implemented for optical, infrared, or baseband networks that use fixed or portable terminals.

In addition to the functionality described above, the designer is free to add additional watch points in any location within the 3-D environmental database at any time during a communication system performance prediction. In the current implementation, the designer clicks with the mouse or other input device on the desired location in the 3-D environmental database to create a new watch point at the selected location that is then updated throughout the remainder of the performance prediction.

In a similar fashion, the preferred embodiment enables a designer to reorient a selected antenna in real-time with respect to any coordinate axis while the graphical display of all drawing watch points is updated to reflect the revised wireless system performance metrics as a result of the new antenna orientation.

In a similar fashion, a designer may replace an existing hardware component in the wireless communication system with any component available from the parts list library. In doing so, the changes to the wireless communication system performance as a result of the replacement is reflected in the graphical display of the watch points.

In a similar fashion, a designer may selectively include or exclude any subset of components within the wireless communication system while selecting components to involve in the wireless system performance calculation. For example, a designer could consider the effect of repositioning a single antenna, or could consider the combined, composite effect on the watch points as individual antennas are repositioned within a wireless system network consisting of additional, fixed antenna placements.

In a similar fashion, the designer may choose to allow watch points to be mobile. That is, instead of positioning a watch point and having the graphical display of the watch point reflect the changing wireless system performance metric, the designer could instead identify a watch point whose position is mobile but whose graphical display remains constant. In this scenario, the position of the watch point fluctuates along a linear path traced between itself and the current location of the mouse cursor until a position within the 3-D database is found at which the desired level of wireless system performance metric is maintained. For example, the designer may create a watch point to maintain a constant graphical display synonymous with −65 dBm RSSI. As the user repositions, reorients, or otherwise alters components within the wireless communication system, the watch point alters its position within the 3-D environmental database until a position is found at which a calculated value of −65 dBm RSSI is determined.

In addition to enabling a designer to reposition, reorient, and/or replace wireless system components in real-time while visualizing the impact of such changes at selected watch points within the 3-D database, the user may choose to maintain the current configuration of the wireless communication system and instead create a single, mobile watch point. The watch point thus created is dynamically repositioned within the 3-D environmental database in real-time by the user by simply repositioning the mouse cursor. Positioning the mouse cursor at a given location within the 3-D environmental database is equivalent to repositioning the watch point to match that location. In the present invention, this technique is used to allow the mobile watch point to represent a mobile user in the 3-D environmental database. As in the previous scenarios, the graphical display of the watch point is updated in real-time to reflect predicted wireless system performance metrics at the watch point position. The designer is free to select individual subsets of wireless system components to involve in the calculations of wireless system performance. Thus the graphical display of the watch point may reflect the performance metrics specific to individual wireless system components or the composite performance metrics due to the combined effect of multiple selected components. For example, the radiating power of multiple antennas can be combined into a single measure of received signal strength.

The two primary uses of the single mobile watch point technique involve the analysis of the forward link (or down link) and reverse link (or up link) of the wireless system. The forward link of a wireless communication system involves the flow of radio signals from the fixed wireless system to the mobile user, while the reverse link of a wireless communication system involves the flow of radio signals from the mobile user to the fixed wireless system. In the present embodiment, line segments are drawn between the mobile watch point (which is also the mouse cursor) to each antenna the designer has included in the wireless system performance prediction. In addition, the individual or subsets of antennas identified as having the best wireless system performance characteristics are differentiated from the other antennas by altering the color and/or other physical appearance of the connector lines between the antennas and the watch point. As the designer then repositions the mouse cursor, the selected location for the watch point in the 3-D database, and therefore the effective location of the mobile user, is adjusted to match that of the mouse cursor. The wireless system performance metrics are recalculated at the watch point location for the antenna components selected by the designer, and the graphical display of the watch point and all connector lines is updated accordingly.

Another improvement over the prior art is the ability to dynamically model the repositioning of leaky feeder antennas and visualize the effects on wireless system performance. A leaky feeder antenna can be thought of as a cable with many holes regularly spaced along its length. Such a cable would experience a signal loss or emanation at every hole and would thus radiate RF energy along the entire cable length. Leaky feeder antenna, or lossy coaxial cable as it is sometimes referred, can be thought of as analogous to a soaker hose where water flows in at the head of the hose and leaks out through a series of holes. The present method allows the designer to dynamically re-position a portion of the leaky feeder antenna and see in real time the effects on wireless system performance at the specified watch points. In the preferred embodiment, distributed antenna systems can be analyzed in terms of the contributions of individual antennas or collections of antennas taken as a whole, providing "composite" results in the latter case.

Figure 5:
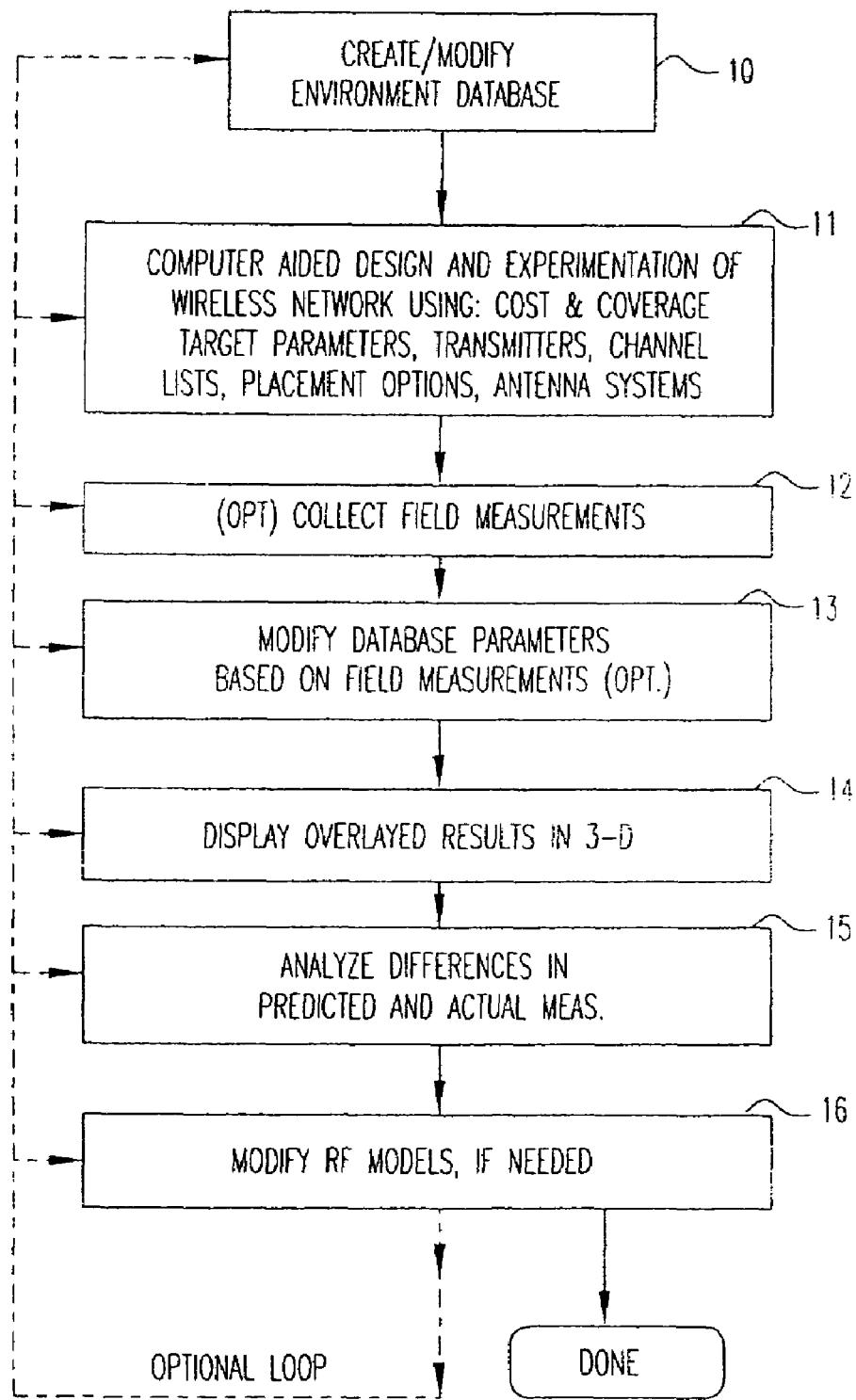
FIG. 5 is a flow diagram of a general method used to design a wireless communication network.

Referring to FIG. 5, there is shown the general method of the invention. Before one can run an automated predictive model on a desired environment, a 3-D electronic representation of that environment must be created in function block 10. The preferred method for generating a 3-D building or environment database is disclosed in the concurrently filed, copending application Ser. No. 09/318,841. The resulting definition utilizes a specially formatted vector database format and comprises lines and polygons rather than individual pixels (as in a raster format). The arrangement of lines and polygons in the database corresponds to obstructions/partitions in the environment. For example, a line in a database could represent a wall, a door, tree, a building wall, or some other obstruction/partition in the modeled environment.

From the standpoint of radio wave propagation, each of the obstruction/partition in an environment has several electromagnetic properties. When a radio wave signal intersects a physical surface, several things occur. A certain percentage of the radio wave reflects off of the surface and continues along an altered trajectory. A certain percentage of the radio wave penetrates through or is absorbed by the surface and continues along its course. A certain percentage of the radio wave is scattered upon striking the surface. The electromagnetic properties given to the obstruction/partitions define this interaction. Each obstruction/partitions has parameters that include an attenuation factor, surface roughness, and reflectivity. The attenuation factor determines the amount of power a radio signal loses upon striking a given obstruction. The reflectivity determines the amount of the radio signal that is reflected from the obstruction. The surface roughness provides information used to determine how much of the radio signal is scattered and/or dissipated upon striking an obstruction of the given type.

Once this 3-D database of obstruction data has been built, the design engineer performs computer aided design and experimentation of a wireless network to be deployed in the modeled environment in function block 11, to be described later. Cost and wireless system performance target parameters, transmitters, channel lists, placement options and antenna systems are all taken into account by the present invention.

In order to fine tune the experimental predictions, RF measurements may be optionally taken in function block 12. A preferred method for collecting RF measurements is disclosed in copending application Ser. No. 09/221,985, supra. If necessary, database parameters that define the partition/obstruction characteristics may be modified using RF measurements as a guide to more accurately represent the modeled 3-D environment in function block 13.

The results of the predictive models may be displayed in 3-D overlaid with the RF measurement data, if any, at any time in function block 14. The design engineer analyzes the differences in the predicted and actual measurements in function block 15, and then modifies the RF predictive models, if needed, in function block 16. If necessary, the 3-D environment database may be modified based on the actual measurements to more accurately represent the wireless system coverage areas in function block 10, and so on iteratively until done. The designer can optionally continue with any other step in this process, as desired.

Figure 6:
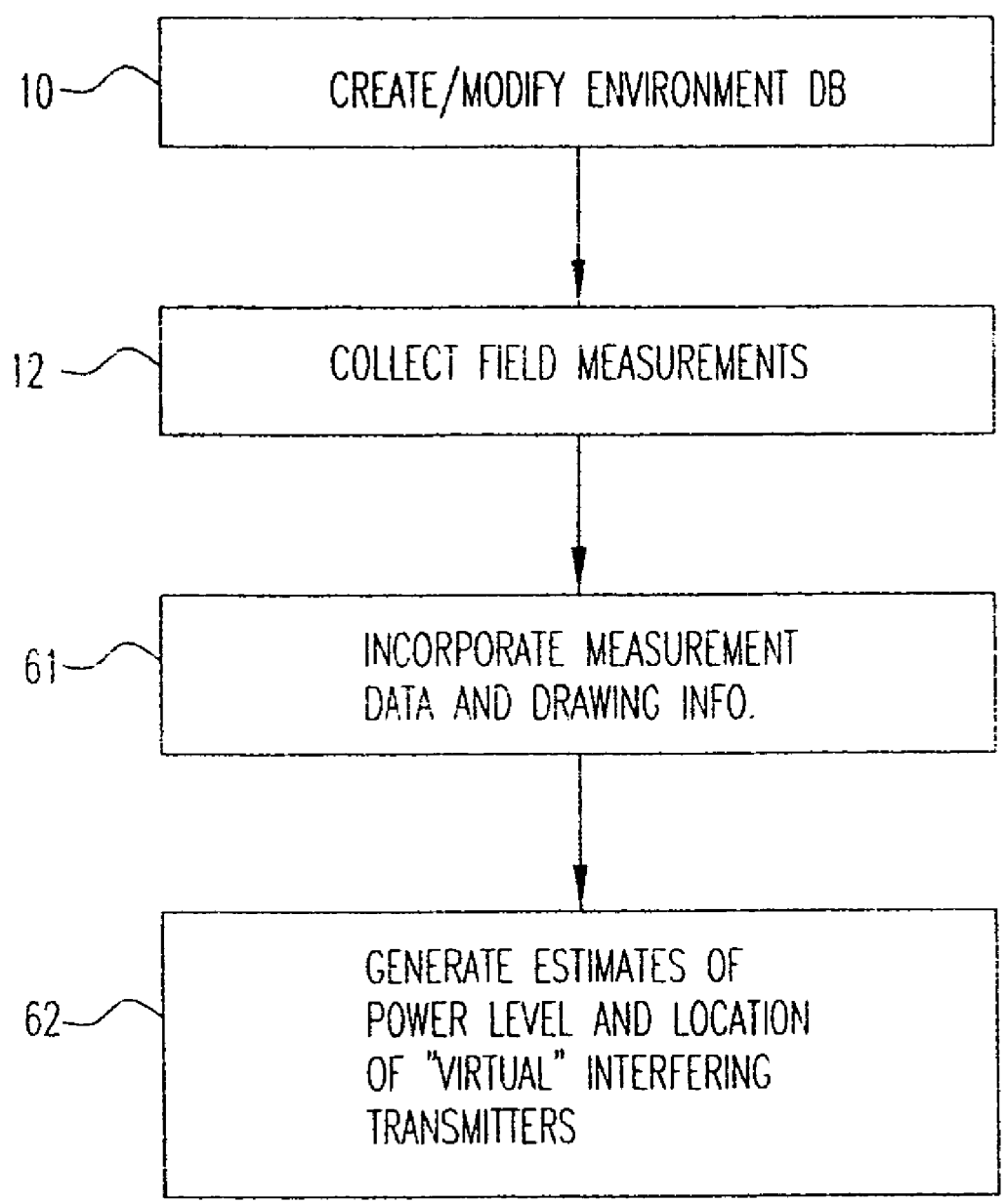
FIG. 6 is a flow diagram of a method used to generate estimates based on field measurements.

The method of invention may be used in a variety of ways depending on the goals of the design engineer. FIG. 6 shows a variant on the above method used to generate estimates based on RF measurements. A 3-D database of the environment must still be generated in function block 10. Field measurements are collected in function block 12. The RF measurement data are then incorporated into the drawing of the environment in function block 61. The design engineer may then generate estimates of power level and location of potential transmitters in function block 62.

Figure 7:
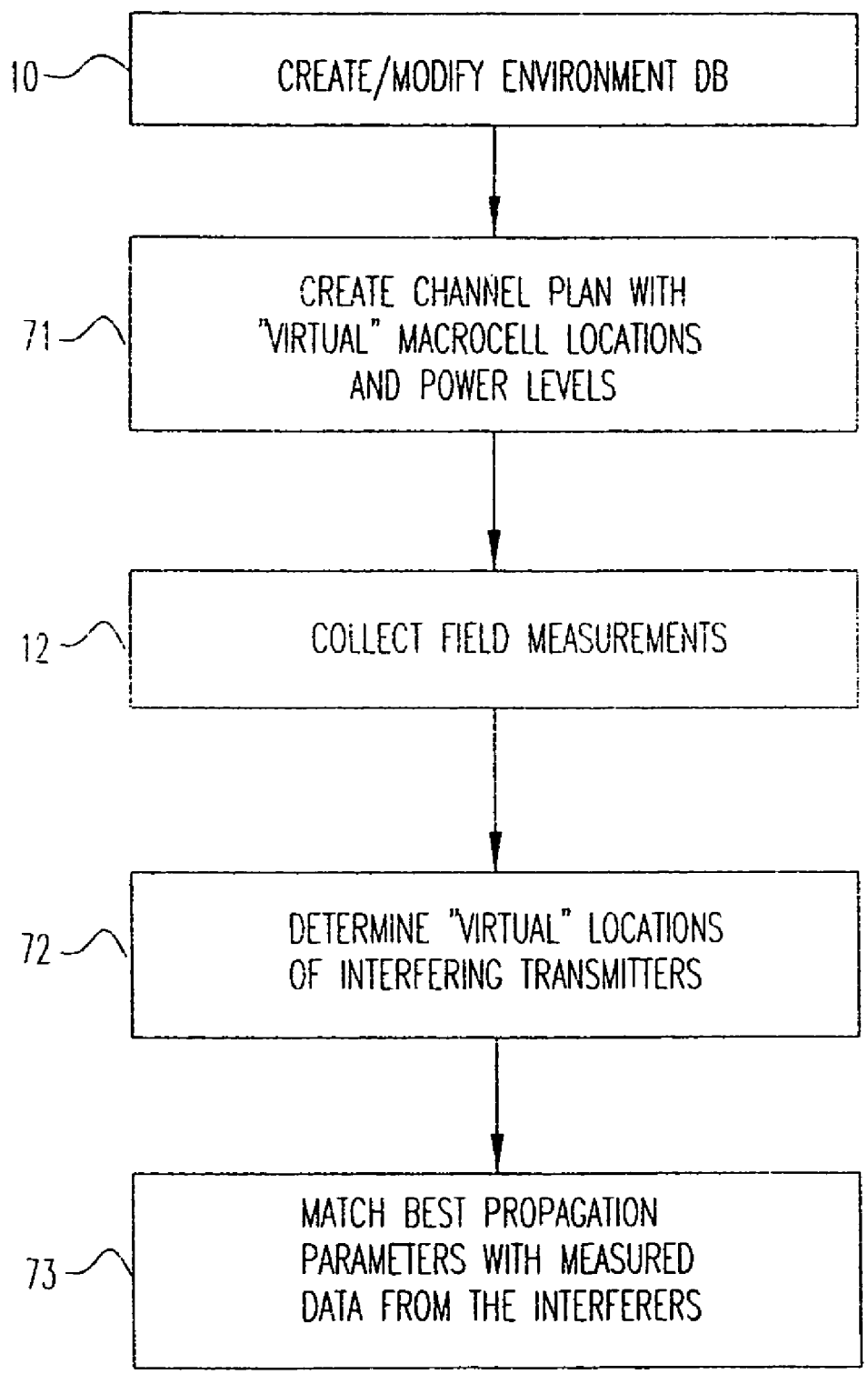
FIG. 7 is a flow diagram of a method used to match best propagation parameters with measured data.

FIG. 7 shows a variant of the method used to achieve optimal prediction accuracy using RF measured data. Once again, a 3-D database of the environment is generated in function block 10. However, before collecting field measurements, the design engineer creates a channel plan with "virtual" macrocell locations and power levels in function block 71. The field measurements are then collected in function block 12 and the "virtual" locations of interfering transmitters can be determined in function block 72. The best propagation parameters are then matched with measured data from the interferers in function block 73.

Figure 8:
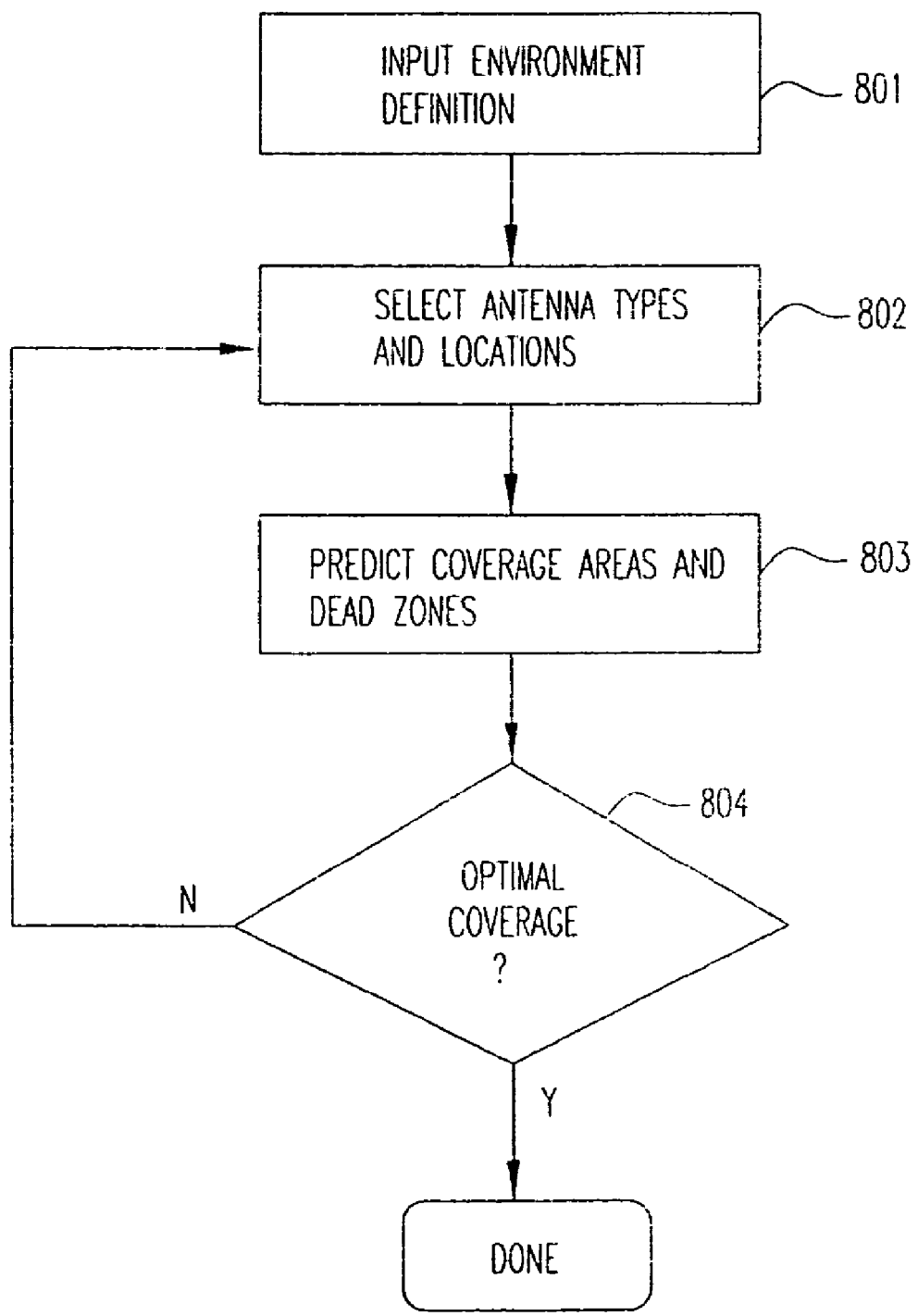
FIG. 8 is a flow diagram of a method for prediction.

A more detailed description of the method for prediction used in the present invention is now described. Referring to FIG. 8, the 3-D environment definition is input in function block 801. The first step required before predicting the performance of the wireless communication system is to model the wireless system with the 3-D environment. Antennas and types of related components and locations are selected in function block 802. The desired antennas are chosen from a parts list of wireless hardware devices that may include a variety of commercially available devices. Each antenna is placed at a desired location within the environment, for instance, in a specific room on a floor of a building or on a flag pole in front of a building. A number of other components may be created and placed either within or connected to each antenna system. These components include, but are not limited to: cables, leaky feeder antennas, splitters, connectors, amplifiers, or any other user defined component.

Figure 9A:
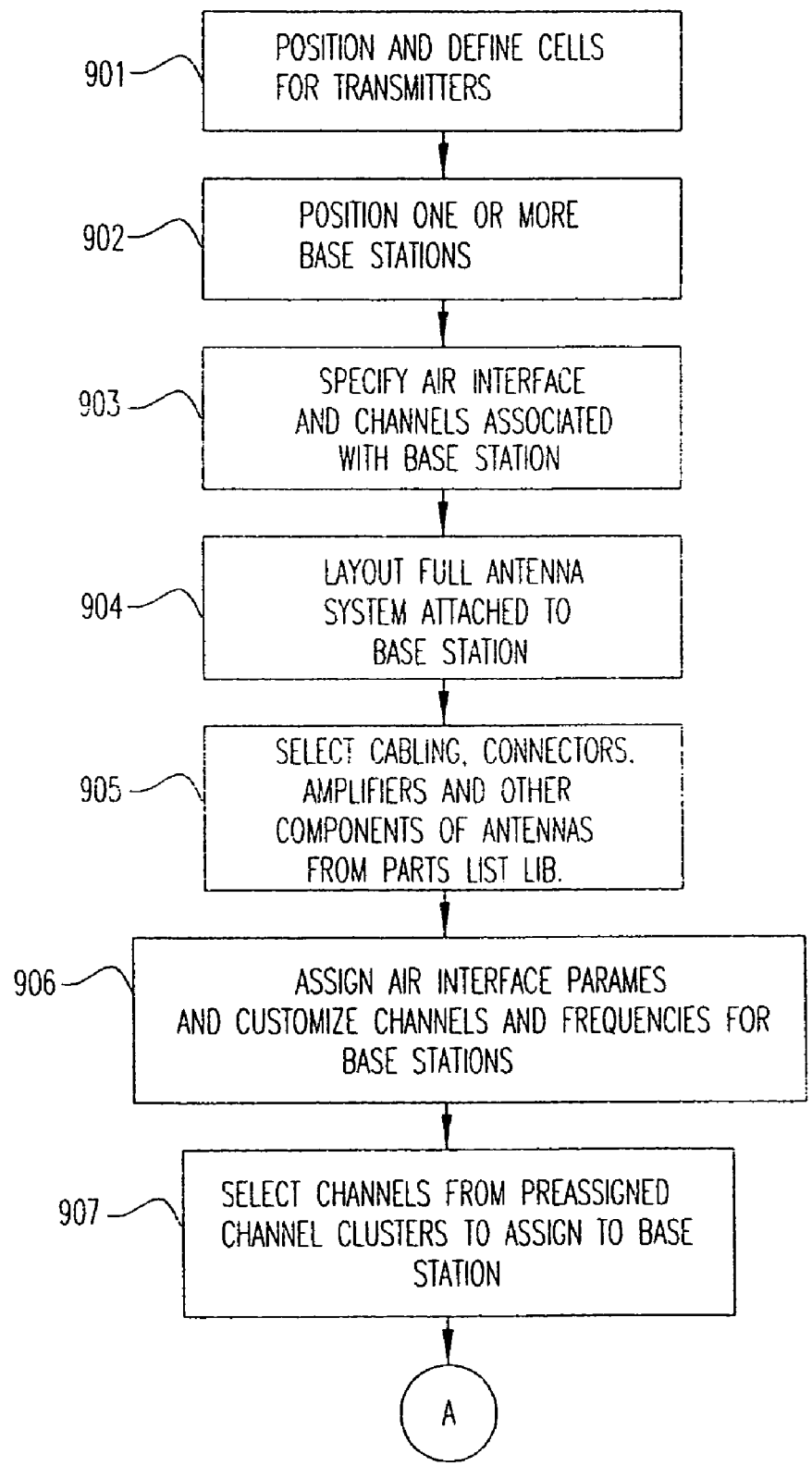
FIGS. 9A and 9B together make up a detailed flow diagram of a method to generate a design of a wireless network and determine its adequacy.
Figure 9B:
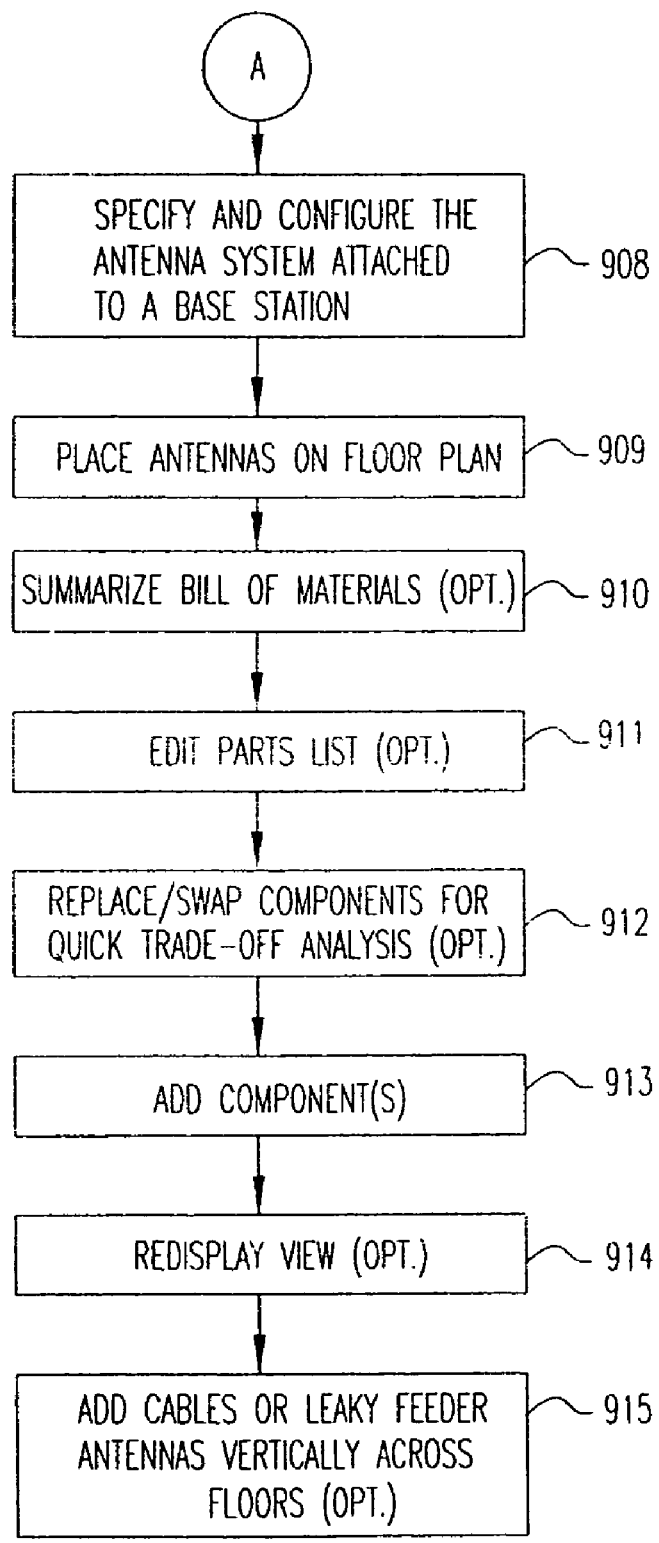

FIGS. 9A and 9B show a method for adding antenna systems to a desired environment and generally for running trade-off analyses. First, the designer positions and defines outdoor wireless communication systems, if necessary in function block 901. Next, the designer positions and defines indoor base stations in function block 902. The methods of function blocks 901 and 902 differ in that the components of indoor wireless system will typically be different than an outdoor wireless system. In both cases, the designer is guided through a series of pull down menus and point-and-click options to define the location, type of hardware components and associated performance characteristics of the antenna systems. This data is stored in a database, that also contains cost and manufacturing specific information to produce a complete Bill of Materials list automatically, to be viewed at any time.

In order to fully describe a communication system in a newly created (or to be modified) wireless or wired system, the designer specifies the air interface/technology and frequencies associated with network protocol, physical media, or a network such as a wireless system in function block 903. For a wireless system, the designer then lays out the full antenna system for the wireless network in function block 904. Components such as base stations, cabling, connectors, amplifiers and other items of the antenna system are then selected from a parts list library containing information on commercially available hardware components in function block 905. Next, the air interface and technology specific parameters are assigned and channel frequencies are customized for the wireless system in function block 906. The channel frequencies are selected from pre-assigned channel clusters and assigned to the wireless system in function block 907. An antenna system is then configured in function block 908, selecting antennas from the parts list library as described above. The antennas are placed on the floor plan in function block 909 using a point and click of a mouse or other positioning device to visually place each component in the 3-D database.

At this or any time after a component has been placed on a floor, the designer may view a bill of materials in function block 910. If necessary, the parts list may be modified to add or delete components or modify a component's cost or performance characteristics in function block 911. Components may be replaced or swapped for similar components for a quick trade-off analysis of both wireless system performance and overall cost in function block 912. Components may be added, deleted or modified to more fully define the wireless communications system in function block 913. The designer may redisplay the view of the environment including the wireless communication system, RF measurement data, and/or wireless system predicted performance results in a variety of forms, including 2-D, 3-D wireframe, 3-D wireframe with hidden lines, 3-D shaded, 3-D rendered or 3-D photorealistic rendering, at any time in function block 914.

Typically, a designer will add network system components in succession, where each newly placed system component connects to a previously positioned component in the network. For a wireless network, one should note that cables and leaky feeder antennas are defined by a series of vertices connected by lines representing lengths of cabling as they are placed on a floor. This is also done for fiber optic and baseband cables. Cables and leaky feeders may also stretch vertically across building floors, down the sides of buildings, through elevator shafts, etc., simply by adding a vertex in the cable, changing the vertical height, and then continuing to place cable in new locations, in function block 915. The designer does not need to manipulate a 3-D view of the environment and attempt to guide the cables vertically in the 3-D model. The designer may repeat any of the steps in this process, in any order, in the present invention.

Referring again to FIG. 8, once the 3-D environment has been defined and antennas, cables and other objects which are used in network design have been selected and located, the wireless system performance prediction models may be run in function block 803. A variety of different such models are available and may be used in succession, or alone to generate a sufficient number of "what-if" scenarios for predicting and optimizing of antenna placements and component selections.

Figure 10:
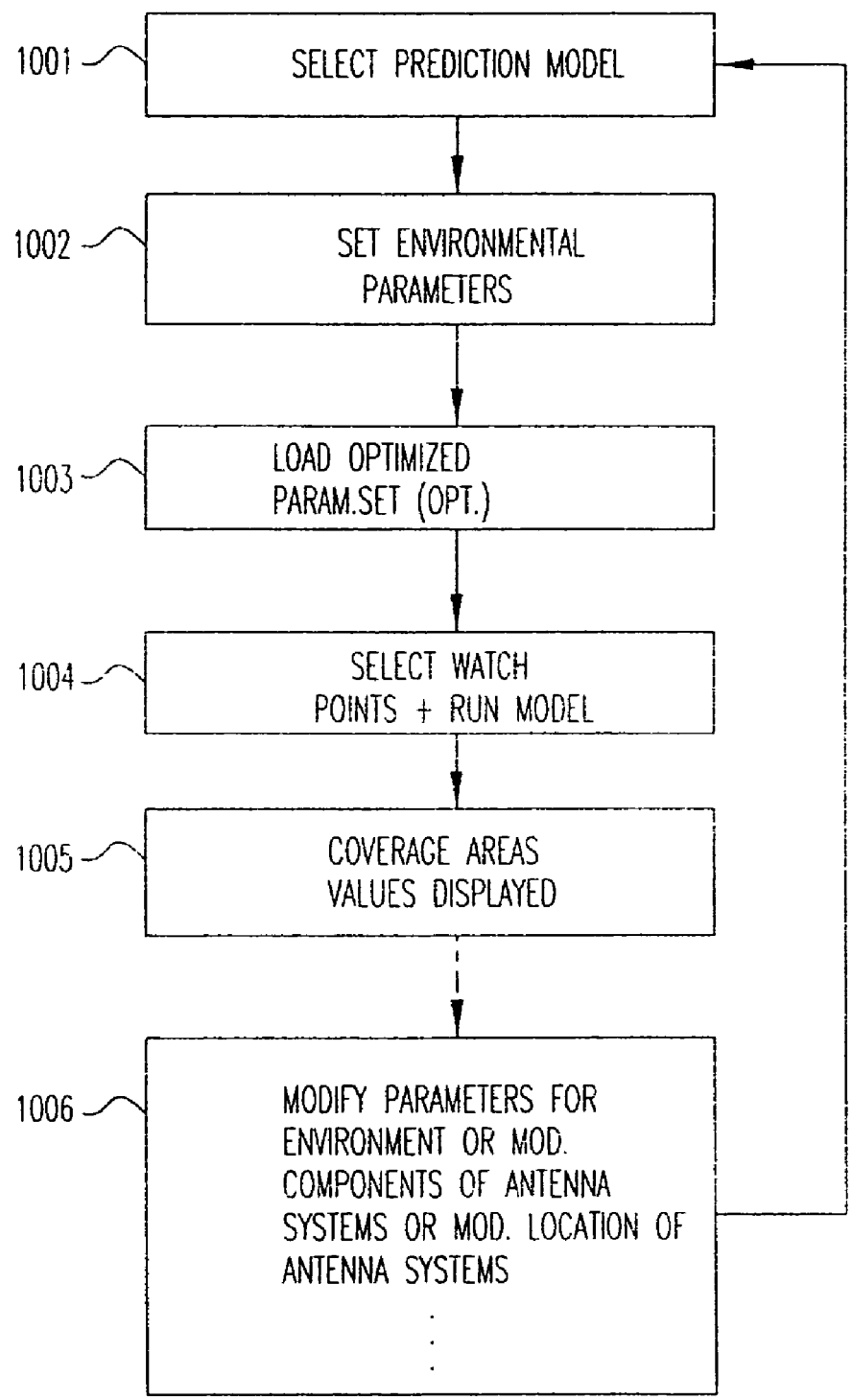
FIG. 10 is a flow diagram showing a method for using watch points during antenna repositioning or modification.

Referring to FIG. 10, a method for predictive modeling according the invention is shown. First, the designer selects the desired wireless system performance prediction model in function block 1001. Preferred models are:
  Wall/floor Attenuation Factor, Multiple Path Loss Exponent Model,
  Wall/floor Attenuation Factor, Single Path Loss Exponent Model,
  True Point-to-Point Multiple Path Loss Exponent Model,
  True Point-to-Point Single Path Loss Exponent Model,
  Distance Dependent Multiple Breakpoint Model,
  Distance Dependent Multiple Path Loss Exponent Model,
  Distance Dependent Single Path Loss Exponent Model, or
  other models as desired by the design engineer.

Also, models for propagation of optical and baseband signals, such as loss, coupling loss, distance-dependent loss, and gains are contemplated.

The physical and electrical properties of obstructions in the 3-D environment are set in function block 1002. Although not all parameters are used for every possible predictive model, one skilled in the art would understand which parameters are necessary for a selected model. Parameters that may be entered include:
  Prediction configuration—RSSI, C/I, and/or C/N (carrier to noise ratio);
  Mobile Receiver (RX) Parameters—power, antenna gain, body loss, portable RX noise figure, portable RX height above floor;
  Propagation parameters—
    Partition Attenuation Factors
    Floor Attenuation Factors
    Path Loss Exponents
    Multiple Breakpoints
    Reflectivity
    Surface Roughness
    Antenna Polarization
  other parameters as necessary for a given model The designer may save sets of physical, electrical and aesthetic parameters for later re-use. If such a parameter set has been previously saved, the designer may load that set in function block 1003, thereby overwriting any parameters already in selected.

Figure 11:
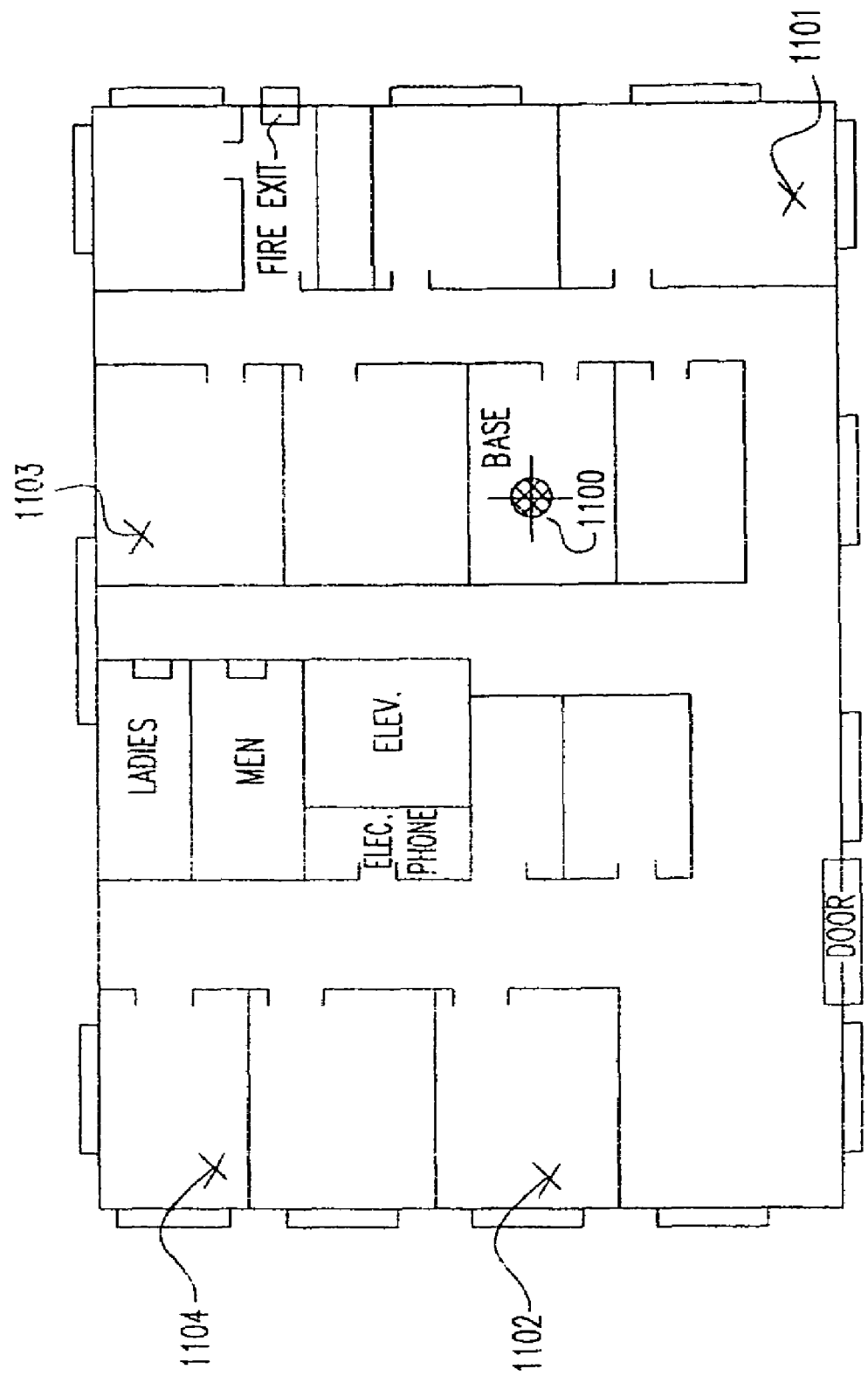
FIG. 11 shows a simplified layout of a floor plan of a building with a base station and watch points selected.

A designer then may select a number of watch points in function block 1004 to monitor for wireless system performance. Referring now to FIG. 11, there is shown a simplified layout of a floor plan with a base station 1100. The designer may use a mouse or other positioning device to point and click to any number of locations in the floor plan to select critical areas, or watch points, for monitoring. Here, for instance, four watch points 1101, 1102, 1103 and 1104 have been selected.

FIG. 12 shows a display, that lists by location, watch points selected for the current prediction. The designer may then select predictions for RSSI, signal to interference ratio (SIR) or signal to noise ratio (SNR). In addition, the designer can see changes in predicted values for each watch point in real time as the mouse is moved, or can choose to select new antenna positions specifically by clicking on a new location. As the designer repositions the mouse cursor, the antenna(s) selected prior to initiating the prediction are effectually repositioned and/or relocated according to position of the cursor. Once all watch points are selected, the prediction model is run. An alternative embodiment is that watch points could be entered and modified on the fly, as the prediction model is being run, rather than defined only prior to running the model. Another alternative embodiment is that RF values at the watch points are updated continuously as the mouse is repositioned, without a click being necessary.

Figure 13:
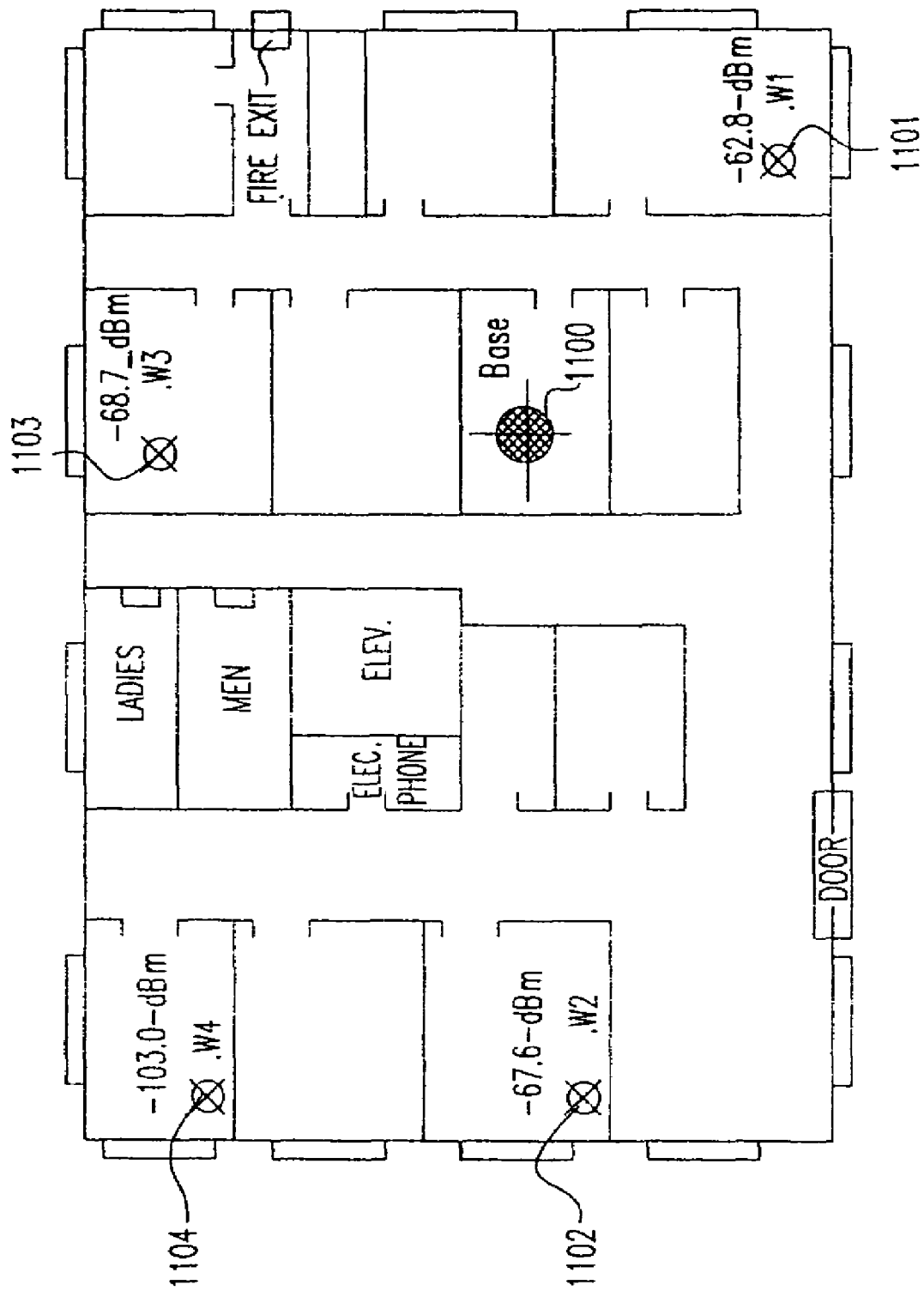
FIG. 13 shows a simplified layout of a floor plan of a building with a base station and initial RSSI values for the selected watch points.
Figure 14:
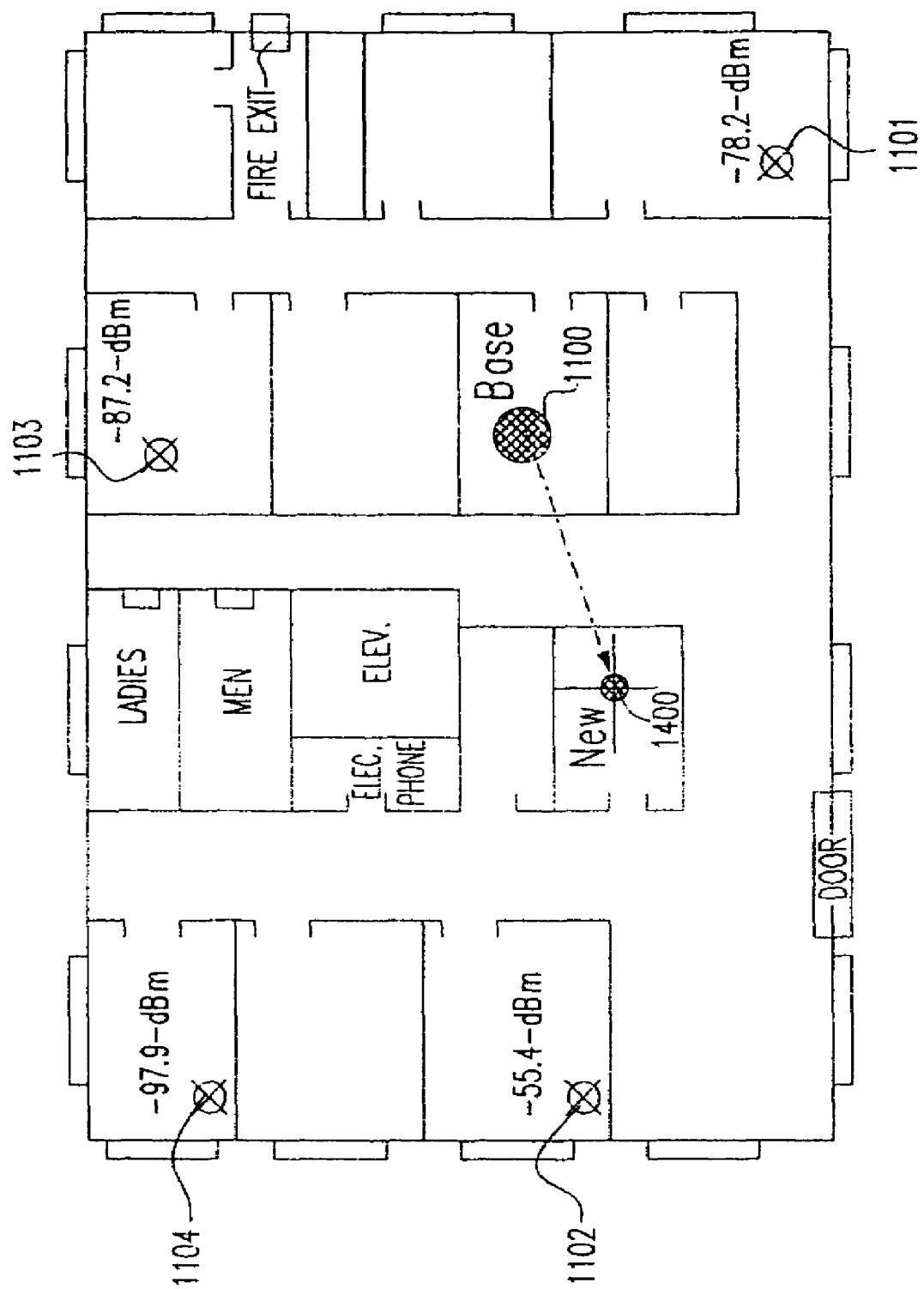
FIG. 14 shows a simplified layout of a floor plan of a building with a repositioned base station and changed RSSI values for the selected watch points.
Figure 15:
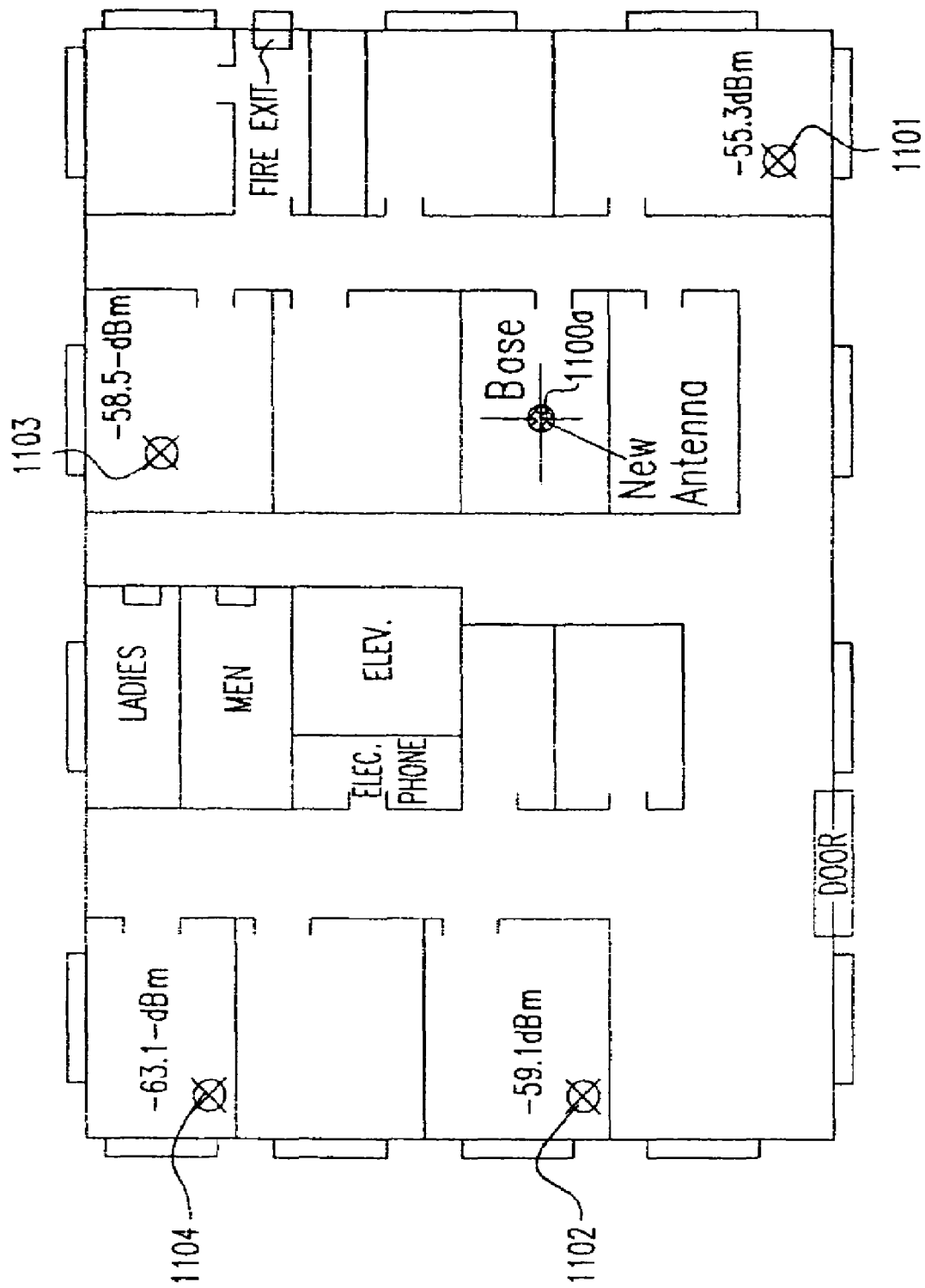
FIG. 15 shows a simplified layout of a floor plan of a building with a re-engineered base station and changed RSSI values for the selected watch points.

FIG. 13 shows the floor plan of FIG. 11 with the initial RSSI values for each watch point 1101, 1102, 1103 and 1104 also shown. The designer may move the antenna 1100 to a new location and monitor the same watch points for coverage. FIG. 14 shows the floor plan of FIGS. 11 and 13 with the antenna 1100 moved to a new location 1400. The RSSI values at each watch point 1101, 1102, 1103, and 1104 are automatically updated with values associated with the new location of the antenna. Alternatively, the designer may choose to modify the components within the antenna system 1100 for performance or cost reasons. FIG. 15 shows the floor plan of FIGS. 11 and 13 with a base station 1100a at the same location, but with a higher performance antenna component. The RSSI values at each watch point 1101, 1102, 1103, and 1104 are again automatically updated with values associated with the new wireless system performance parameters.

Referring again to FIG. 10, for RF coverage models, the coverage areas and values are displayed in function block 1005. If so desired, the designer modifies the electrical parameters of the obstructions, or modified components of antenna systems, or modifies antenna system locations or orientation, etc. in function block 1006 before running another prediction model in function block 1001.

Referring again to FIG. 8, after running a number of models, the design engineer may determine that RF coverage is optimal in decision block 804. If so, then depending on the results either a change in the location of antenna(s) and components will be desired or possibly just a substitution of components without a location change. For instance, even though the coverage may be more than adequate, the total cost of the wireless system could be prohibitive. A method for optimizing the costs using a dynamic, real time, bill of materials management system is disclosed below. Regardless, if the wireless network as currently modeled is not deemed optimal, then the method would continue again in function block 802 to re-select the components.

Once the design is as desired, then the 3-D database holds all of information necessary to procure the necessary components in the Bill of Materials. The locations of each component are clearly displayed, and a visual 3-D representation can be viewed as a guide.

Once the communications system design is as desired, the database holds all of information necessary to procure the necessary components in the Bill of Materials. The locations of each component are clearly shown, overlaid with the physical environment, and a visual 3-D representation can be viewed as a guide.

Generating and Managing a Bill of Materials

As described above, in more detail, the invention uses 3-D computer aided design (CAD) renditions of a building, collection of buildings, or any other such environment that contains information suitable for the prediction of a communications system performance. In an RF system, estimated partition electrical properties can be extracted from radio frequency measurements already published, and/or specified by the designer at any time. Once the appropriate electrical properties are specified, an unlimited number of RF sources can be placed in the 3-D database, and received signal strengths intensity (RSSI) or carrier-to-interference (C/I) ratios can be plotted directly onto the CAD drawing.

The 3-D environment database could be built by a number of methods, the preferred method being disclosed in the co-pending application Ser. No. 09/318,841. Traffic capacity analysis, frequency planning, and Co-channel or adjacent channel interference analysis can be performed concurrently with the prediction of RSSI, C/I and other wireless system performance measures. The antenna system and bill of materials could be built by a number of methods. The preferred method for building the antenna system is described above.

As the designer builds a model of a wireless communications system in a specified environment, as described above, a full bill of materials is maintained for every drawing in the environment. That is, each drawing may contain its own unique set and arrangement of antennas, feed systems and related components representing a variation in the design of a wireless communication system. These components are drawn from a global parts list library. A number of methods could be used to generate the global parts list library, and it would be apparent to one skilled in the art that varying formats could be used.

In the present invention, the design engineer selects a specific wireless system hardware component from the parts list library using pull-down menus and displayed dialog windows. The selection criteria for a particular component is wireless system design dependent, but generally involves the desirability of a component based upon its electrical characteristics and potential effect on wireless system performance, material cost, and/or installation cost. The present invention enables the designer to narrow the focus of component selection to only those devices contained within the parts list library that have the desired characteristics. For example, the design engineer may choose to design a wireless system using components from a specific manufacturer or set of manufacturers that have a desirable material cost and/or electrical characteristics. In doing so, only those devices that meet the requested criteria are displayed for selection from dialog windows in the present invention.

In certain instances, the operating frequency of a wireless communication device may define the electrical characteristics of the device. For example, depending on the frequency of the radio signal passing through an amplifier, the amplifier could have a varying amount of gain. Likewise, the radiating characteristics of antennas differ depending upon the frequency of the radio signal being broadcast. Coaxial cables, connectors, splitters, and other wireless communication system hardware components can also share this property of frequency dependent performance. To accommodate this, the parts list library from which the wireless communication system components are drawn may contain frequency specific information for each component. For example, an amplifier may have its gain specified for both 800 megahertz and 1900 megahertz. If this information is available within the parts list library for a component, the present invention automatically utilizes the frequency varying performance characteristics of the wireless hardware components within the performance prediction calculations as described below. The frequency of operation, in this case, is obtained from the transmitting source that is providing the radio signal to the wireless hardware component. For example, the base station or repeater to which the wireless hardware component is attached will have a range of frequencies or channels that it operates upon. In this case, the frequency of operation of the repeater or base station determines the frequency of the radio signal input into the wireless hardware component, and the frequency of the radio signal is in turn used to determine the operating characteristics of the component.

In addition to frequency dependent characteristics, many wireless communication devices have limitations in the manner in which they may be connected within an antenna system. Certain wireless communication hardware components are incompatible with other components and may not be connected together. For example, a fiber optic cable may not attach directly to a coaxial cable. Instead, a fiber optic cable would first connect to an optical-to-radio frequency converter device, which converts the data stream from optical into a radio signal. The coaxial cable would then connect to the output port on the optical-to-radio frequency converter. In the preferred embodiment of this invention, such connectivity restrictions are specified within the parts list library. Thus, the system automatically utilizes the information to prevent the designer from interconnecting incompatible components. If the designer attempts to interconnect two incompatible components, the present invention provides appropriate warning messages to notify the designer of the error.

Practicing communication network engineers spend tremendous amounts of time in the design and deployment phase trying to configure proper connections between communication components, such as coaxial cables, optical cables, adapters, antennas, routers, twisted pair cables, leaky feeder antennas, base stations, base station controllers, amplifiers, attenuators, connector splitters, antenna systems, repeaters, switches, wireless access points, cable boxes, signal splicers, transducers, couplers, splitters, convertors, firewalls, power distribution lines, hubs, and other communication components that are known and understood by network engineers working in the cable, optical, wireless, networking and telephone industries. Often, various manufacturers make different brands of equipment, that are designed for particular frequency bands, mounting conditions, temperature conditions, and connector types. For example, radio frequency (RF) components often have N-connectors or SMA connectors which may not be interconnected without a proper adapter, and cables must have the proper type of connector in order to properly interconnect with other components. Similar connector types and sizes of connectors and cables exist for various makes and models of optical fiber cables, baseband twisted pair and CAT-3 and CAT-5 cables, radio frequency connectors and cables, and all other components listed above. Furthermore, network designers are often concerned about specific cost limitations, not just of a single device, but a connection of components, and often the entire system design. What's more, designers must avoid the improper mismatch of physical attributes, such as the improper connection of a very heavy component (say a switch box or a power amplifier) to a lightweight mounting fixture or a lightweight cable (say RG-58/u) that is unable to support the weight, temperature, or windload, for example. Also, particular network installations may be required in environments that have small size, low temperature, low or unusual power, or aesthetic requirements, or other particular requirements that take into account the physical attributes of the components within the network design. One skilled in the art of design and deployment of communication networks is aware of other examples as taught here that typically arise in practical network design and deployment.

In addition, engineers and technicians often have particular brands or makes of products that they are required or wish to use in all of their designs. For example, their employer may insist that only certain brands be used for all deployment and design. Or, specific model numbers or series of part numbers may be required in a design. The specification and proper matching of brands or part numbers for the design of a network, which we term "brand choice", is important for desired results in many practical settings. Furthermore, components within a communications network must have compatable power connections (e.g., an RF distribution system would want to have active components that all use the same DC voltage, so that multiple power distribution lines would not have to be run), and components must be properly matched in size, weight, mounting configuration, impedance, and color. Also, designers must be sure that when they create a network design, components which they specify must have comparable maintenance requirements. For example, a designer should not create a network that requires some components to have constant maintenance, whereas others require only infrequent inspection and tuning (a mismatch in maintenance requirements).

On an even broader scale, it is helpful to have a simple checking method for making sure that components are properly designed to match the gross physical media of the various components. Some network components use and transfer or process optical frequencies (lightwaves), while others use radio frequency (RF), such as millimeter, UHF, VHF, or microwave signals, or baseband signals (VHF and below). Telephone cable, 10baseT, twisted pair or CAT-5 type signaling is typically baseband, for example. Components which are modeled in the present invention can take in optical signals and transform them into RF or baseband signals. Similarly, some components take in RF signals and convert them to optical signals. In the design and deployment of a network, it is vital that optical cables be connected directly to optical sources, as opposed to RF or baseband signal sources. Otherwise, a network will not work. Other devices which take input signals that are at RF and produce output signals that are at optical frequencies exist. In addition, components that convert or transduce baseband-to-optical, or any other of a number of combinations of these various gross frequency bands. Physical media, which also may be called modality, may include the cables used in the network design, or may actually describe the processing components that receive and transmit at the different gross frequencies.

Components may not have compatible frequency ranges of operation, so that one part is designed for 800-950 MHz while another is designed for 1900-2100 MHz (or 200 nm vs. 300 nm, etc.). Components might have incompatibilities at the level of specific connectors, so that a connector on one component could connect with specific connectors on a specific component, but not with other connectors. Components also may require the connection of other specific components directly to them, or the presence of specific other components in the antenna system, RF distribution system, and power supply distribution system, in order to function correctly. Conversely, components may not allow the presence of specific other components, or of components from some manufacturers, to be connected directly to them, or even to be present anywhere in the design.

All of the above network design considerations are important for a designer or installer. Also, all of the individual connectors on each component within a network, as well as each frequency or gross frequency band used by each component and each connector on each component, needs to be properly tracked and must all be used and properly terminated for an effective network.

The above issues are all addressed in the present invention. Failure to meet any of the above desired criteria can be considered to be a "fault", wherein a fault can be detected automatically by the present invention in the design or deployment phase. Thus, desired cost, proper connectivity, proper matching of physical attributes, and proper connection of brands, part numbers, or manufacturers, can be readily detected and properly implemented with ease. Other faults, which follow the same logic as described above would fall within the scope of this invention. When proper criteria are met, a fault will not be indicated, and the components within the design are used for computation of predictions of network performance. Also, the predictions of performance in a proper design may be compared directly to other designs within the same environment, as well as with actual measured field data.

Similarly, many wireless communication devices have limitations on the signal power that may be input into them. For example, an amplifier may only function properly if the input signal to the amplifier does not exceed a certain level of power. In the present invention, the power of a signal supplied to a wireless hardware component is determined to be the output power of the radio signal leaving the device to which wireless hardware component is attached within the antenna system. Typically, wireless communication system hardware components have gains and/or losses such that when a radio signal passes through a component, the radio signal is either amplified or attenuated depending on the operating characteristics of the component and the frequency of the radio signal. For example, referring to FIG. 4, one of the omnidirectional antennas 403a is attached to a coaxial cable 402, which in turn is attached to a transmitter 107 via a splitter 401. If the transmitter 107 is transmitting with a signal power of 10 dBm, and the total loss of the splitter 401 is 4 dB, the input signal power into the coaxial cable 402 is 6 dBm (the signal power of the transmitter minus the total loss of the splitter). Similarly, if the total loss of the cable 402 is 2 dB, the input signal power into the antenna 403a is 4 dBm. In the preferred embodiment of the invention, the parts list library contains information regarding the restriction of input signal power into a component. This allows the system of the present invention to notify the user of the fault in the design via displayed computer dialog boxes if, given the present configuration of the antenna system that has been visually configured and interconnected in the 3-D environmental model, that the input signal power into any of the wireless communication system hardware components exceeds the limits specified in the parts list library. This immediate feedback is invaluable to the designer and provides instant recognition of potential problems in the configuration of the antenna system.

Similarly, many cable components used in wireless communication systems have limitations on the total length of any single segment of the cable. For example, a single segment of a specific fiber optic cable may not have a length exceeding 500 feet in order to maintain the integrity of the signal passing through it. In the preferred embodiment, the parts list library will contain such length limitations specified for cabling components. Therefore, if the designer visually configures a segment of cabling within a wireless communication system such that the total length of the segment exceeds the maximum cable length specified for the cable component within the parts list library, a warning message concerning this fault in the design is displayed to the designer via computer generated dialog boxes stating the error. The total length of the cable segment is determined from the manner in which the designer has positioned the cable within the 3-D environmental database. For example, referring again to FIG. 4, the length of the coaxial cables 402 in the figure is determined on the basis of their physical placement and orientation within the 3-D environmental model. This immediate feedback provides invaluable information to a wireless system designer as it prevents potential errors in the wireless communication system design. The maximum length restriction applies to all varieties of cabling components, such as coaxial cables, fiber optic cables, leaky feeder antennas, and any other type of wireless hardware cable.

Other limitations of a component may be imposed. The component may need to be within a certain distance from a base station, regardless of intervening components. A component may need to be a certain height above ground level, within a certain distance from a wall (internal or external) or from a high-voltage power supply source, or placed in a room of sufficient size. A component may be illegal for use in a given location, or unavailable from the manufacturer from a given ordering location. A component may be too large to fit through existing apertures providing access to an indoor location as modeled in the 3-D environment database above. A component may be too heavy for a floor, or too lightweight for an unattached position. A component may be the wrong size, color, or shape. A component may be unsuitable for environmental conditions at a given indoor or outdoor location. Components made by specific manufacturers may be unsuitable. Components exceeding a per-component price limit may be unsuitable for a given design; such limits may be set for a given type of component e.g. amplifier, antenna, or cable, or may be set for any type of component. One skilled in the art could formulate many other obvious attributes that could also be checked for faults in a design, in the same manner.

A component may be marginally compatible with a given antenna system and RF distribution system for a given site. Manufacturer-specified warnings, maintained with other component characteristics in the component library, could be delivered appropriately for these situations. For example, a manufacturer may specify that a given component may be used at a given power level and perform properly, but that the engineer should be warned that the component will have a reduced operational lifetime, or may perform in a sub-optimal manner, or cause damage to other connected parts, if used at the current input signal strength level. One skilled in the art would understand that this extends to other fault warnings about other marginally suitable components.

The present invention stores these fault warnings and the relevant conditions under which the warnings apply, in the parts list library, and automatically compares the conditions in which a component is placed in an antenna system and RF distribution system in a 3-D model of a wireless network site, and if the conditions match, displays a fault warning dialog window (not shown) to the user containing the manufacturer's warning, which must be dismissed and/or printed before the engineer is allowed to proceed with the design.

In the present invention, a cost limitation may be imposed on a given design, such that when the engineer places a component which would cause the total cost of the installation, or a portion of the installation (which is tracked in real time as indicated above) to exceed the limit, a fault warning is given. At this point, components which are relatively expensive, or inexpensive components appearing repeatedly in the design, might be identified automatically by the system as candidates for replacement for cheaper parts.

Figure 19:
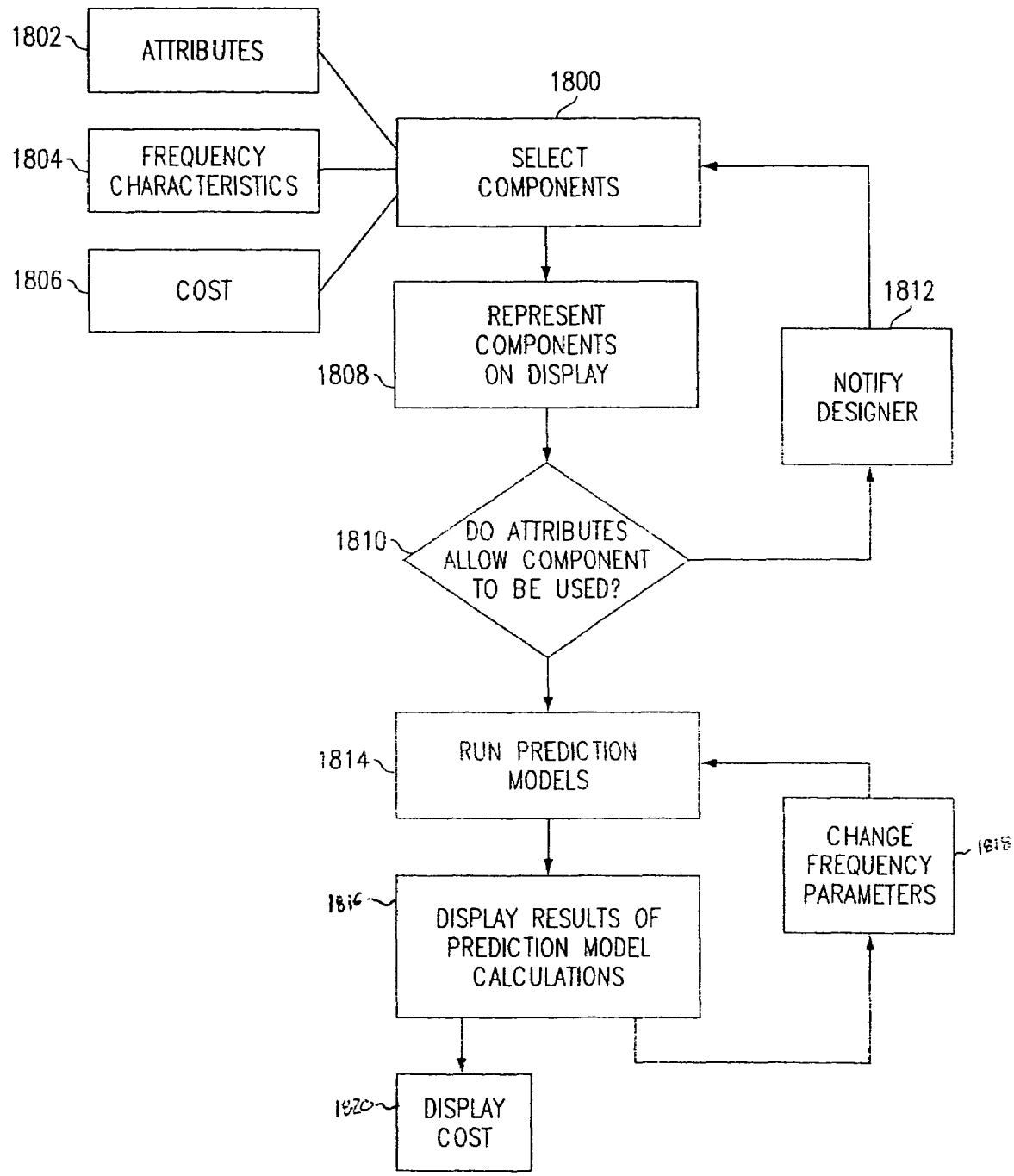
FIG. 19 is a flow diagram showing the mechanisms for considering the effects of various attributes on and frequency characteristics on the communications system design, and, as required for notifying the designer of any inherent design flaws.

FIG. 19 shows a high level schematic of one mechanism which may be used to provide the design engineer with information on system performance and cost information. In block 1800, he selects components which will be used in the computerized model of the physical environment in which the communications network is or will be installed. There will be a plurality of different types of components which can be selected (e.g., splitters, antennas, transmitters, base stations, cables, etc.), and there will be a plurality of models of the types of components selected (e.g., various types of fiber optic cables, coaxial cables, antennas, etc.). The components will have various attributes 1802 (e.g., type of signal carried (i.e., optical or radiowave), maximum propagation length (for cables), etc.), frequency characteristics 1804 (e.g., electrical properties of a component at two or more frequencies, etc.), and cost 1806 information associated with one or more components which are selected in decision block 1800. The selected components will then be displayed on the computerized representation of the physical environment in which the communications system is or will be installed in block 1808. The system will automatically determine, based on the attributes 1802, whether the components selected can properly work together as intended by the designer or whether the components will satisfy all of the demands required of them in the communications system designed by the designer or any other error which may be present in the communications network at decision point 1810. If the communications network will not perform properly, the designer will be notified of the fault(s) in the design by a display on the screen, audible warning, or other effective means at block 1812. This will allow the designer to go back and select more suitable components. If there are no faults in the design proposed by the designer, one or more prediction models will be run at block 1814, and the results of these calculations will be displayed to the designer at block 1816. If changes in frequency parameters are to be considered in the prediction models, this can be done at block 1818. If desired, the cost of the componentry used in the communications network designed by the designer can be provided in a bill of materials at 1820.

In addition, in the preferred embodiment the parts list library contains specifications for compound components, hereafter referred to as "component kits." A component kit is a predefined group of select individual wireless communication components which may or may not be partially or wholly interconnected and arranged. Component kits are specified separate from a 3-D environmental model and are not related to the physical layout of a facility. For example, a component kit could consist of a specific splitter connected with a specific cable, which in turn is connected with a specific antenna. The component kit does not define where in the 3-D environmental model the splitter, cable, and antenna are positioned, but simply identifies that they are connected or assembled together. The designer may then select the component kit itself in exactly the same manner as any other individual hardware component and position the complete kit within the 3-D environmental model. Thus, by selecting the kit and positioning it within the 3-D environmental model, the designer has automatically selected and positioned the splitter, cable, and antenna.

An important and novel capability of the present invention is the ability to provide communication network performance predictions that use the component kits, and to allow such predictions to be compared with measured network data. In practice, actual communication networks may be configured using system components which are configured in a specific manner, and this specific physical and electrical representation may be done approximately or completely in its entirety by a component kit. Component kits also contain much more detailed information of each component or subsystem within the kit, such as physical media specifications for proper gross frequency interconnection, physical attributes, cost, depreciation and maintenance schedule information, so that proper interconnections within a kit, and from one or more kits to another kit, or from one or more kits to a network, may be made without a "fault", as described herein. Measurements made from actual systems comprised of components that are modeled either exactly or approximately in a component kit within the present invention may be displayed, stored, and compared directly to predictions made by systems designed with the component kit.

Figure 20:
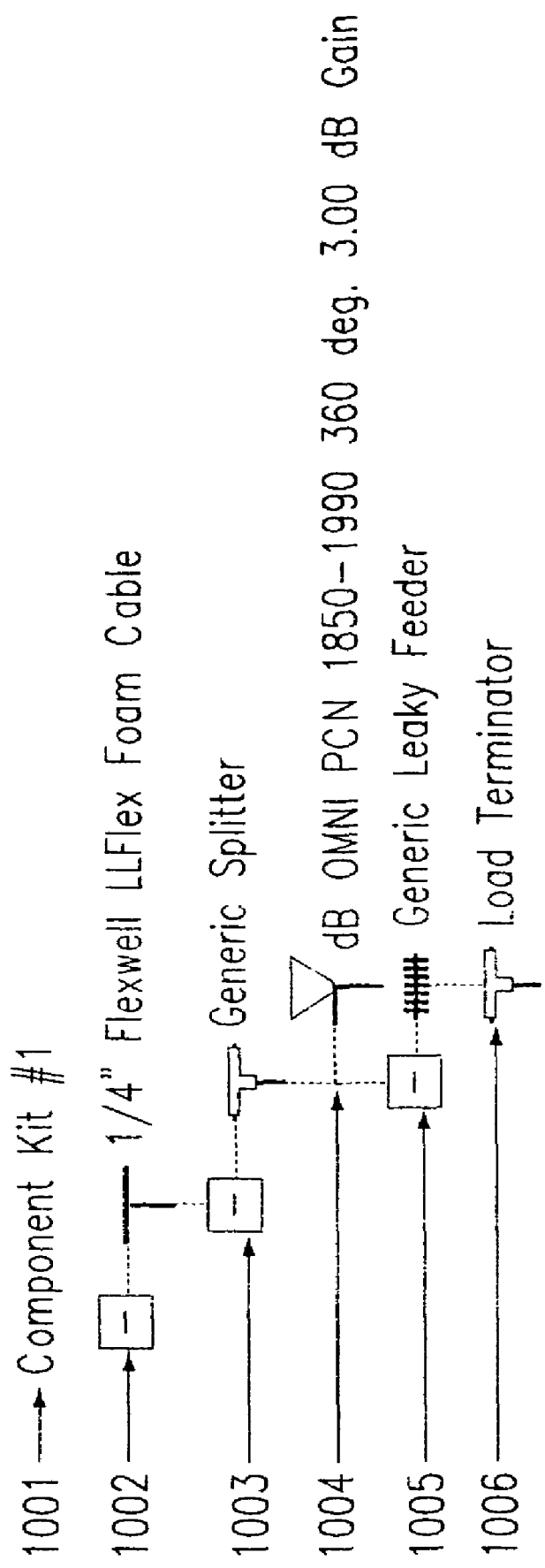
FIG. 20 is a computer display showing the assembly of a "component kit" according to the present invention.
Figure 21:
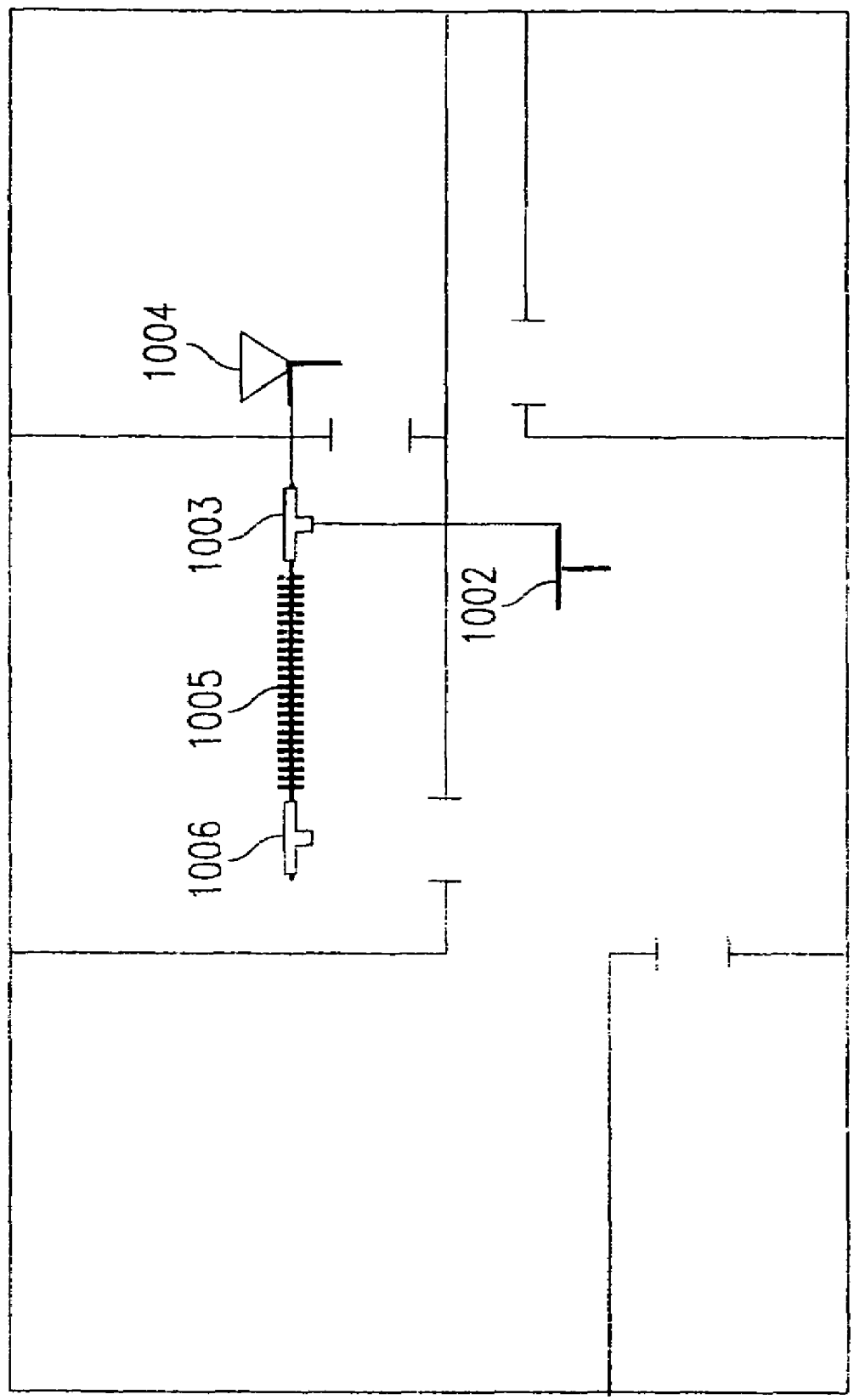
FIG. 21 is a schematic representation of a floor plan on which the components of a "component kit" have been displayed.

Referring to FIG. 20, there is shown a representation of the component kit computer editing window in the preferred embodiment of the invention. In FIG. 20, a component kit named "Component Kit #1" 1001 is shown. The component kit represents five individual components that are interconnected in a certain fashion. A coaxial cable 1002 is connected with a splitter 1003. One output connector of the splitter connects to an antenna 1004, while the other output connects to a leaky feeder antenna 1005. The leaky feeder antenna then terminates 1006. The computer editor window 1007 graphically portrays the interconnection of the various components, and enables the designer to add or remove components to the component kit. Once created, the component kit 1001 can be selected and positioned within the 3-D environmental model just as any individual component. For example, FIG. 21 shows each of the components 1002-1006 of component kit 1001 positioned in one room of a three dimensional floor plan. The design engineer can then connect other components in the communications network, but also may select other groups of components or "component kits" for use in the facility defined by the three dimensional floor plan (or multistory facility or campus wide communications network). This enables the designer to quickly place multiple components in the 3-D environmental model by enabling the multiple components to be selected as placed as a single component.

Once a desired component is selected by pointing and clicking with a mouse or other input device (components and component kits may be imported, exported, and exchanged electronically and textually between users in the preferred embodiment of the invention), the design engineer may position the component within the three dimension environmental database. This process involves the design engineer using the mouse or other input device to visually identify the desired location for the component by clicking (or otherwise identifying) positions within the 3-D environmental database. For example, an antenna component could be placed within a specific room of a building, atop a flag pole on the side of a building, in the center of a park, or any other location deemed reasonable by the designer. In similar fashion, hardware components that span distances (e.g. coaxial cable, fiber optic cable, leaky feeder antenna, or any component having substantial length) are selected and positioned within the 3-D environment by clicking with the mouse or other input device to identify the vertices (or end points) of the component where each pair of vertices are connected by a time segment representing a portion of cable. Thus, while certain components, such as point antennas or splitters, for example, require only a single point in the 3-D environment to identify placement in the wireless communication system, other components such as distribution cables or distribution antennas require the identification of multiple points joined by line segments to identify placement. In the present invention, unique graphic symbols are utilized to represent each wireless system component and overlaid onto the three-dimensional environmental database enabling the designer to visualize the wireless communication system as it would exist in the physical world. As an example of the graphical display and shown only in two dimensions for convenience, FIG. 4 displays a base station 107 connected via two coaxial cables 402 to two indoor point antennas 403a and 403b.

The present embodiment of the invention provides and links information relating to wireless system component dependence. Such dependencies may include but are not limited to impedance matching of adjoining components, maximum run length, proper termination, or some other fault, as described herein. Certain components in the parts list library may require pre-existing components to have been positioned within the 3-D environmental database before they themselves may be selected and added to the wireless system. For example, a splitter or other device designed to interconnect two or more independent components may require that an existing component be present in the three dimensional database for the splitter to be connected with. In the previous embodiment of the invention, if the designer chooses to place a hardware component within the 3-D environmental database, and the desired component is dependent upon some other device currently placed in the 3-D database, the designer is prompted through a selection window to identify the dependent component and the selected component is positioned accordingly. In the previous example of the splitter component, if the designer chooses to connect the splitter onto the end of an existing cable component by identifying the cable component with the mouse or other input device, the position of the splitter within the three-dimensional database is automatically assigned to be the end of the identified cable. In this way the invention helps prevent the user from creating faulty designs. Wireless system components that do not have such dependencies (e.g., base station transceivers) may be freely positioned anywhere within the 3-D environmental database that is deemed suitable by the designer. As this description is specific to one particular implementation, one skilled in the art could see how different implementations could be developed and practiced within the scope of this invention.

In the preferred embodiment of the invention, if the wireless communication hardware components have information specified within the parts list library detailing restrictions on, for example, maximum input signal power, maximum length, or connectivity restrictions, the present invention will notify the designer immediately if any of these restrictions or limitations are exceeded during the course of the design. This notification of a potential fault occurs via computer generated dialog boxes containing textual warning messages detailing the restriction or limitation being exceeded with the present configuration of the wireless communication system within the 3-D environmental model.

Using the preferred embodiment of the invention, a designer can model and represent, visually as well as mathematically, complex wireless communication systems involving any number of individual hardware components selected from the parts list library, interconnected with and linked to one another to form complete antenna systems. As each component has associated characteristics regarding electrical properties (e.g. gain, noise figure, attenuation) and cost, the addition, removal, or change of any component directly impacts both the performance of the wireless system and the overall system cost. With the preferred embodiment of the invention, this information is updated in real-time as the designer makes changes to the wireless system. If a wireless communication system includes a specific hardware component, the present invention retrieves the associated electromechanical characteristics and other pertinent information from the parts list library entry that has been specified for the component. This information is stored in a database and is then used to quantify the effect that the component has on various aspects of wireless system design parameters or performance. For example, if the parts list library information for a specific cable indicates that the attenuation loss of the cable is 3.5 dB per 100 meters, and the designer has added a 200 meter segment of the cable to the wireless communication system, the present invention combines the information regarding the placement and length of the cable in the 3-D environmental database with the attenuation loss information from the parts list library to determine a total attenuation loss of 7 dB for the cable. Furthermore, the noise figure and other related qualities of the cable is also computed based upon well known communication theory. If the designer then adds an amplifier to the wireless system and connects it onto the end of the cable as described above, the invention retrieves information regarding the amplifier from the parts list library to determine overall gain of the wireless distribution system. If, for instance, the selected amplifier has an associated gain of 10 dB and some specified noise figure, the present invention combines the characteristics of the interconnected cable and amplifier to determine a total gain of 3 dB for the combined components, and a new system noise figure. If the designer edits or alters component information in the parts list library, this is automatically reflected in the wireless system performance prediction. For example, if the amplifier in the example above has the gain associated with it edited in the parts list library and changed from 10 dB to 15 dB, the combined system characteristics, which may include but are not limited to system gain and system noise figure, of the cable and amplifier from the example are automatically recalculated, resulting in an overall gain of 8 dB instead of 3 dB. Similarly if the cable is repositioned such that its overall length is altered or replaced with a different component from the parts list library, the effect of doing so is automatically recalculated an reflected in all future operations.

As mentioned previously, the Parts List Library preferably contains information regarding the frequency dependent nature of a wireless system component, the operating characteristics of the component utilized during the calculation of gains, losses, noise figure, or any other qualities that utilize the frequency of the input signal into the component to determine the specific set of operating characteristics for the component. If the component does not have a set of parameters defined for the desired operating frequency, the present invention searches for and uses the set of operating parameters specified for the frequency closest to the actual frequency of the input signal. This is a very powerful feature of the present invention as it enables a designer to select components for use in a wireless communication system without the need to worry about the operating parameters of the component relative to the operating frequency of the wireless communication system. The present invention automatically uses the best set of frequency dependent parameters specified for each wireless hardware component based on the frequency of the input signal to the component.

The Parts List Library, or component library, of the present invention also contains information regarding operating characteristics of a component which depend on some combination of the frequency of the input signal to the component, the connector on the component to which the input is applied or through which output is passed, and the direction of the signal, i.e., forward link from the base station to the mobile receiver or reverse link back to the base station from the mobile receiver. The preferred embodiment specifies a coupling loss that applies to a particular component, for a particular frequency range and modality, for a particular connector on the component, for a particular directionality of signal (i.e., forward link or reverse link). A different coupling loss is specified explicitly (or may be derived automatically) for each combination of connector, supported frequency band (of which a given component may have many), and directionality. These values are preferably applied automatically in real time to the aforementioned system performance predictions, according to the active frequency of the signal arriving at and/or leaving a component, the connector on which the modeled signal arrives at and/or leaves the component, and whether the forward link or reverse link performance is being evaluated. One skilled in the art could implement additional specifications dependent on combinations of the frequency, connector, directionality, or other aspects of the signal applied to a component.

Although the given example is in terms of simple gains and losses of the individual wireless components, one skilled in the art could apply this same method to any other electrical, electromechanical, financial, aesthetic or other quality associated with components in the parts list library and the overall system in a similar fashion.

A preferred Parts List Library is designed to be generic and applicable to any type of wireless communication system component or wireless communication system design methodology. There are eight basic categories of components in the preferred parts list library utilized in the preferred embodiment, although more categories could be added, as desired:

1. Amplifiers/Attenuators—generally speaking, devices that either boost or decrease the strength of radio wave signals;

2. Connectors/Splitters—generally speaking, devices that connect one or more components to one or more additional components;

3. Cables—various types of cabling (e.g., fiber optic cable, coaxial cable, twisted pair cable, etc);

4. Manufacturer-Specified Point Antennas—any antenna that is manufactured and whose manufacturer has supplied information with regard to the radiation pattern of the antenna. The radiation pattern of an antenna describes the manner in which radio signals are radiated by the antenna. Antenna manufacturers supply radiation pattern information regarding their antennas so that wireless system designers can maximize the effectiveness of antenna deployments;

5. Generic Point Antennas—any generic or idealistic antenna (that is, an antenna that may not be physically realizable or has a generic radiation pattern);

6. Leaky Feeder Cabling/Antennas—a type of antenna that takes the form of a specialized coaxial cable;

7. Base Station/Repeater—the controlling portion of the wireless communication system. The base station manages all communication taking place in the wireless network;

8. Component kit-one or more individual components interconnected or grouped interconnected together to form a compound component (this preferably being done within the discretion of the design engineer by selecting amongst all or some of the components in the Parts List Library to define one or more component kits made of selected components). The component kit is referenced as a single hardware component and enables the designer to quickly add and manipulate multiple wireless hardware components. It preferably has no directly assigned electromechanical properties defined in the Parts List Library; however, the individual hardware components contained within the component kit retain all electromechanical properties assigned to them within the Parts List Library; and 9. Other—Any component that does not belong in one of the above categories.

Each component has a variety of associated values. These include, but are not limited to:

Manufacturer Name;
Manufacturer Part Number;
User-supplied Description;
Frequency range at which part has been tested;
Attenuation/Amplification;
Number of Connections;
Physical Cost (material cost of component);
Installation Cost;
Antenna Radiation Pattern;
Maximum input signal power;
Maximum length (for cables);
Modality of component type (e.g., optical, radio signal, etc.)

Note that many or all of the associated values listed above could vary depending on the frequency of the input signal to the component. They may also depend on the combination of input signal frequency, connector on the component to which the signal is applied or via which the signal exits the component, and whether the signal is a forward link signal originating at the base station, or reverse link signal originating from a user of the system. The parts list library utilized in the preferred embodiment of the invention allows the amplification/attenuation, radiation pattern, and maximum input signal power to be identified for specific frequencies of frequency ranges for each wireless hardware component. The coupling loss varies by frequency, connector, and direction of signal (forward or reverse link), in the preferred embodiment.

Base stations and repeater components have a number of additional parameters associated with them, including, but not limited to:

Technology/Air Interface—identifies the wireless technology employed by the base station (e.g., AMPS ("analog cellular"), IS-136 ("digital cellular"), IEEE 802.11 ("wireless LAN"), etc.);

Frequency/Channel Assignments—identifies the radio frequencies/channels this base station can utilize; and Transmit Power—the amount of power the base station is broadcasting.

An excerpt from the preferred embodiment of a parts list is shown below.

```
<ComponentSpec>
    <databaseKey>5110</databaseKey>
    <name><![CDATA[Ultraflexible Series Cable]]></name>
    <type>CABLE</type>
    <manufacturer><![CDATA[Bob's Cables and
        Connectors, Inc.]]></manufacturer>
    <partNumber><![CDATA[Model 21-A]]></partNumber>
    <purchaseCost>0</purchaseCost>
    <installationCost>0</installationCost>
    <maximumLength>none</maximumLength>
    <fileDescriptor><![CDATA[N/A]]></fileDescriptor>
    <otherInfo><![CDATA[N/A]]></otherInfo>
    <connectorCount>2</connectorCount>
    <bandList>
        <BAND>
            <modality>R</modality>
```

-continued

```
            <minFreq>4e+008</minFreq>
            <maxFreq>4e+008</maxFreq>
            <inputSignalMaxFwd>none</inputSignalMaxFwd>
            <inputSignalMaxRev>none</inputSignalMaxRev>
            <outputSignalMaxFwd>none</outputSignalMaxFwd>
            <outputSignalMaxRev>none</outputSignalMaxRev>
            <insertionLoss>7.42</insertionLoss>
            <associatedConnector>
                <number>0</number>
                <couplingLossFwd>0</couplingLossFwd>
                <couplingLossRev>0</couplingLossRev>
            </associatedConnector>
            <associatedConnector>
                <number>1</number>
                <couplingLossFwd>0</couplingLossFwd>
                <couplingLossRev>0</couplingLossRev>
            </associatedConnector>
        </BAND>
        <BAND>
            <modality>R</modality>
            <minFreq>4.5e+008</minFreq>
            <maxFreq>4.5e+008</maxFreq>
            <inputSignalMaxFwd>none</inputSignalMaxFwd>
            <inputSignalMaxRev>none</inputSignalMaxRev>
            <outputSignalMaxFwd>none</outputSignalMaxFwd>
            <outputSignalMaxRev>none</outputSignalMaxRev>
            <insertionLoss>7.87</insertionLoss>
            <associatedConnector>
                <number>0</number>
                <couplingLossFwd>0</couplingLossFwd>
                <couplingLossRev>0</couplingLossRev>
            </associatedConnector>
            <associatedConnector>
                <number>1</number>
                <couplingLossFwd>0</couplingLossFwd>
                <couplingLossRev>0</couplingLossRev>
            </associatedConnector>
        </BAND>
        <BAND>
            <modality>R</modality>
            <minFreq>7e+008</minFreq>
            <maxFreq>7e+008</maxFreq>
            <inputSignalMaxFwd>none</inputSignalMaxFwd>
            <inputSignalMaxRev>none</inputSignalMaxRev>
            <outputSignalMaxFwd>none</outputSignalMaxFwd>
            <outputSignalMaxRev>none</outputSignalMaxRev>
            <insertionLoss>10</insertionLoss>
            <associatedConnector>
                <number>0</number>
                <couplingLossFwd>0</couplingLossFwd>
                <couplingLossRev>0</couplingLossRev>
            </associatedConnector>
            <associatedConnector>
                <number>1</number>
                <couplingLossFwd>0</couplingLossFwd>
                <couplingLossRev>0</couplingLossRev>
            </associatedConnector>
        </BAND>
    </bandList>
</ComponentSpec>
```

This excerpt from the parts list of the present invention is the complete specification of a single component. The excerpt is in XML format, and each element of the specification is labeled with XML tags. The <ComponentSpec> tag begins the component, the <databaseKey> tag indicates the internal database key used to index the part, and the </databaseKey> ends the value for the internal database key. Similarly, the specifications include the manufacturer identified by <manufacturer>, the part name identified by <name>, and so on. There is also a list of frequency bands, marked off by a <bandList> tag. Each band, demarcated by a <BAND> tag, contains specifications which apply only when the signal applied to the component is closest to the particular band. For a band, the modality (e.g. optical, RF, baseband, CAT-5) is indicated with a <modality> tag, and symbolized by 'R' for RF, 'O' for optical, etc. The minimum and maximum frequency that bound the band are marked by <minFreq> and <maxFreq> tags; the signal maxima for input and output, forward and reverse link, respectively, for the band are also defined, as is the insertion loss for the band. Finally, a list of connectors supported by the band in question appears, marked by an <associatedConnector> tag. Each set of specifications for an associated connector include the connector number as an identifier, and a separate coupling loss for the forward link and for the reverse link, identified by the <connectorNumber>, <couplingLossFwd>, and <couplingLossRev> tags.

Thus the present invention defines specifications dependent on the frequency alone; dependent on the frequency and the component's connector; and dependent on the frequency, the connector, and the link direction, whether forward or reverse.

The parts list can be easily modified by a design engineer as new components are placed on the market, removed from the market or re-priced. The ability to maintain a unique equipment list for each drawing enables the designer to carry out rapid design analyses to compare and contrast the performance and cost of different vendor components. The impact of utilizing a specific component in terms of both cost and wireless communication system performance can be seen immediately using the present invention. Information that can be tracked with the bill of materials includes the manufacturer and part number, physical and installation cost, RF loss characteristics, connections, and the frequencies for which the component is valid. In addition, a rich set of customization features is utilized to enable the designer to tailor the parts list library to suit the needs of the target application. Moreover, as components with associated length data, such as cables or leaky feeder antennas, are created, stretched, moved or modified, their associated costs and impact on wireless system performance are automatically updated in the bill of materials to account for the change in length. Furthermore, the parts list is stored as an integral part of the drawing database, allowing the user to recall and archive a system design and all of its particulars. In addition, the wireless communication system performance may be recalculated immediately, using either a standard link budget equation, noise figure equation, or some other metric such as bit error rate or network throughput. This recalculation uses the specific, perhaps frequency specific electrical specifications of each component in the system, which are also stored in the bill of materials.

Referring again to the drawings, and more particularly to FIG. 16, there is shown an example of a bill of materials summary for a drawing. A description of the base station "MACROCELL" 1610 is shown to identify the antenna system for which the summary is shown. The first component 1611 is a PCN Panel 1710-1990 92 Deg 9.00 dB Gain point antenna manufactured by Allen Telecom. One should note that the component cost 1612, sub-total cost 1613 and total system cost 1614 is $0.00. This shows that the designer has not yet updated the parts list library with current costs. When the list has been updated, the summary will automatically show component costs as well as sub-totals and totals for all base stations and components in the drawing.

FIG. 17 show a bill of materials where costs have been entered into the parts list database. Another component 1720 has been added to the "MACROCELL" base station, also. The costs of each component 1612a and 1721 are now shown. Sub-total 1613a and Total costs 1614a are also shown.

Figure 18:
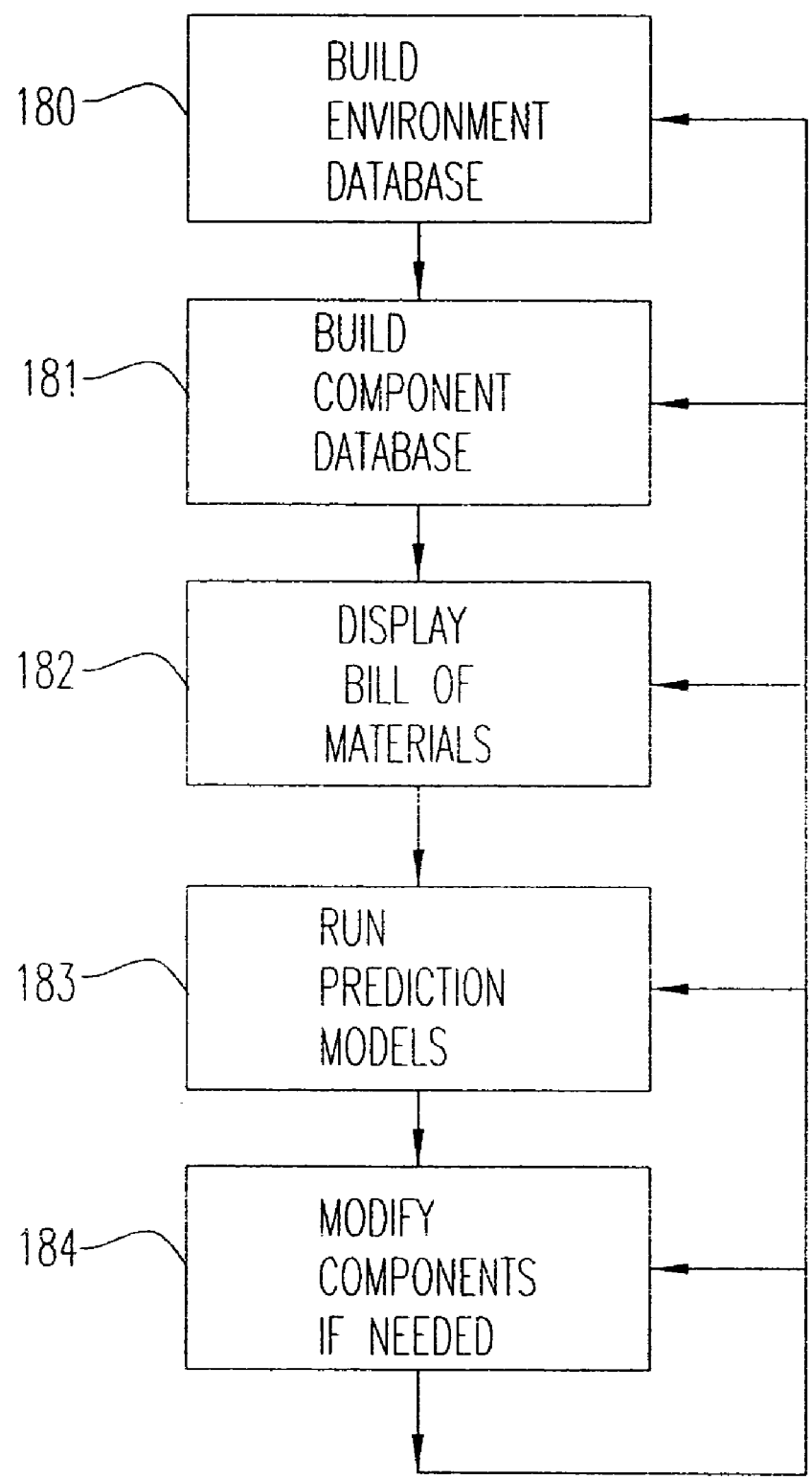
FIG. 18 is a flow diagram showing the general method of the present invention.

Referring now to FIG. 18, the general method of the invention is shown. As previously described, first the designer must create a database defining the desired environment in function block 180. A preferred method is disclosed in the co-pending application Ser. No. 09/318,841. A database of components is then developed in function block 181. In the case of wireless communication networks, a preferred method is described above. The creation of these components will automatically generate a parts list categorized by base station and antenna system. A bill of materials may be displayed at any time in function block 182.

In order to optimize the design of the wireless communications system and ensure adequate antenna coverage, the designer runs a series of prediction models and optimization techniques in function block 183. A preferred method for running predictions is described above. This method allows the designer to see, in real-time, changes in coverage, generally, and for specifically chosen watch points, as antennas are repositioned or reoriented. The designer may choose to add, delete or substitute components in function block 184 and then re-run the models again in function block 183. Each time the designer makes a modification in the system to improve performance, the bill of materials is automatically updated. The designer may run the prediction models in function block 183, and determine if the wireless system, as designed, is adequate in terms of performance and cost. If not, the designer can choose to modify components using cost or component performance considerations. Performance parameters may be entered to enable the designer to choose substitute components from a list that contains only those components that would not degrade the performance of the overall system. Note that in the preferred embodiment, the prediction or system performance models are recomputed upon user demand, but that it would be apparent to one skilled in the art to also have models recomputed instantly ("on-the-fly") as new components are added or subtracted from the bill of materials.

The integration of the bill of materials and component performance specifications is key to providing a quick and efficient method to design high performance wireless communication networks that are within budget. In addition to individual component physical and installation costs, a collection of components that may be interconnected or possibly used within a common network may also be specified. Such components from a component kit may be used in a design, and also may be considered for physical and installation cost. Moreover, within a bill of materials containing a list of network components, there may also be a tabulation, computation and storage of other important cost information for some of the components, such as cost depreciation values, or schedules for depreciation of particular components or groups of components. Such information may be available for only certain components within a network or within a parts list provided by a particular manufacturer. In addition, maintenance schedule information, which specifies the particular period or dates during which routine maintenance is required, may be included within the description of components within a bill of materials, to help the maintenance staff to properly maintain the designed network.

While the invention has been described in terms of its preferred embodiments, those skilled in the art will recognize that the invention can be practiced with modification within the spirit and scope of the appended claims.

The invention claimed is:

1. A method for analyzing a communications network having a plurality of components, the method comprising:

obtaining a site-specific computerized model of a physical environment associated with the communications network;

obtaining information pertaining to each of the plurality of components that are used in said communications network from a parts list library, wherein at least some of said information obtained from the parts list library includes frequency-dependent characteristics of particular ones of the plurality of components, the frequency-dependent characteristics comprising a plurality of values for an operating characteristic of the particular component, each of the plurality of values describing the operating characteristic of the particular component at a different operating frequency;

modeling performance characteristics of the communications network based upon the information and the site-specific computerized model at a modeled operating frequency, wherein the modeling comprises automatically evaluating the particular components using one of the plurality of values for the operating characteristic of the particular component obtained from the parts list library that corresponds to the modeled operating frequency; and displaying the performance characteristics on a computer display.

2. The method of claim 1 wherein the information about each of the plurality of components is represented by a standard mark up language in said parts list library.

3. The method of claim 1 further comprising generating a bill of materials in response to the modeling.

4. The method of claim 1 wherein the modeling comprises modeling electrical performance of the communications network.

5. The method of claim 1 wherein the modeling comprises determining a cost of said communications network.

6. The method of claim 1 wherein the modeling comprises processing maintenance records of said communications network.

7. The method of claim 1 wherein the modeling comprises providing measurement of said communications network.

8. The method of claim 1 wherein the modeling comprises visualizing within said she-specific computerized model of said physical environment a configuration of said communications network.

9. The method of claim 1 wherein the modeling comprises verifying proper interconnections between the components.

10. The method of claim 1 wherein the modeling comprises identifying errors in interconnections in said communications network having said one or more components.

11. The method according to claim 1, wherein the displaying comprises automatically displaying updated performance characteristics of the communications network on the display in response to a change in the modeled operating frequency.

12. The method according to claim 11, wherein the displaying comprises displaying different coverage areas as the modeled operating frequency changes, wherein each of the different coverage areas are computed using a different value for the operating characteristic that corresponds to the modeled operating frequency.

13. The method according to claim 12, wherein each of the plurality of values for the operating characteristic of the particular component corresponds to operation of the particular component at an operating frequency within one of a plurality of frequency bands.

14. The method according to claim 11, wherein the each of the plurality of values for the operating characteristic of the particular component corresponds to operation of the particular component at an operating frequency within one of a plurality of frequency bands.

15. The method according to claim 14, wherein the plurality of frequency bands correspond to a plurality of wireless standards.

16. A system for analyzing a communications network having a plurality of components, the system comprising:

an electronic storage configured to store a parts list library comprising information pertaining to each of the plurality of components, wherein at least some of said information includes frequency-dependent characteristics of particular components of said plurality of components, wherein the frequency-dependent characteristics comprise a plurality of values for an operating characteristic of the particular component, each of the plurality of values describing the operating characteristic of the particular component at a different operating frequency;

a processor configured to model performance characteristics of the communications network at an operating frequency based upon a site-specific model of a physical environment associated with the communications network and upon information obtained from the parts list library including the values for the operating characteristics for the particular components of the communications network that correspond to the modeled operating frequency; and a display in communication with the processor that is configured to display the performance characteristics.

17. The system of claim 16 wherein the information about each of the plurality of components is represented by a standard mark up language in said parts list library.

18. The system according to claim 16, wherein updated performance characteristics of the communications network are automatically displayed on the display in response to changes in the modeled operating frequency of the particular component.

19. The system according to claim 16, wherein the display is further configured to display updated performance characteristics of the communications network in response to changes in the modeled operating frequency, wherein each of the different coverage areas are computed using a different value for the operating characteristic that corresponds to the modeled operating frequency.

20. The system according to claim 19, wherein each of the plurality of values for the operating characteristic of a particular component are values corresponding to operation of the particular component at an operating frequency within one of a plurality of frequency bands.

21. The system according to claim 18, wherein each of the plurality of values for the operating characteristic of a particular component are values corresponding to operation of the particular component at an operating frequency within one of a plurality of frequency bands.

22. The system according to claim 21, wherein each of the plurality of frequency bands correspond to one of a plurality of wireless standards.

23. A method for analyzing a communications network having a plurality of components that are each represented in a site-specific computerized model of a physical environment associated with the communications network, the method comprising:

obtaining information pertaining to each of the plurality of components that are used in said communications network from a parts list library, wherein at least some of said information obtained from the parts list library includes frequency-dependent characteristics of particular ones of the plurality of components, the frequency-dependent characteristics comprising a plurality of values for an operating characteristic of the particular component, each of the plurality of values describing the operating characteristic of the particular component at a different operating frequency;

modeling performance characteristics of the communications network based upon the information and the site-specific computerized model at a modeled operating frequency, wherein the modeling comprises automatically evaluating the particular components using one of the plurality of values for the operating characteristic of the particular component that corresponds to the modeled operating frequency; and displaying the performance characteristics on a computer display.

24. The method according to claim 23, wherein the displaying comprises automatically displaying updated performance characteristics of the communications network on the display in response to a change in the modeled operating frequency.

25. The method according to claim 23, wherein the displaying comprises displaying different coverage areas as the modeled operating frequency changes, wherein each of the different coverage areas are computed using a different value for the operating characteristic of the particular component that corresponds to the modeled operating frequency.

26. The method according to claim 25, wherein the each of the plurality of values for the operating characteristic of the particular component corresponds to operation of the particular component at an operating frequency within one of a plurality of frequency bands.

27. The method according to claim 23, wherein the each of the plurality of values for the operating characteristic of the particular component are values corresponding to operation of the particular component at an operating frequency within one of a plurality of frequency bands.

28. The method according to claim 27, wherein the plurality of frequency bands correspond to a plurality of wireless standards.

29. The method of claim 27, wherein the frequency dependent characteristics of the selected specific component change in response to a change in said operating frequency from one to another of a plurality of gross frequency bands.

30. The method of claim 28, wherein each of the plurality of gross frequency bands correspond to one of a plurality of wireless standards.

31. The method of claim 23 wherein the particular ones of the plurality of components comprise an antenna, wherein the operating characteristic of the antenna represents a gain of the antenna, and wherein the plurality of values of the operating characteristic of the antenna comprises different values of the gain of the antenna for different operating frequencies of signals passing through the antenna.

32. The method of claim 23 wherein the particular ones of the plurality of components comprise a cable, wherein the operating characteristic of the cable represents an attenuation, and wherein the plurality of values of the operating characteristic of the cable comprises different values of the attenuation for different operating frequencies of signals passing through the cable.

* * * * *

UNITED STATES PATENT AND TRADEMARK OFFICE
CERTIFICATE OF CORRECTION

PATENT NO. : 7,680,644 B2 Page 1 of 1
APPLICATION NO. : 10/697557
DATED : March 16, 2010
INVENTOR(S) : Rappaport et al.

It is certified that error appears in the above-identified patent and that said Letters Patent is hereby corrected as shown below:

Column 31, line 39, "she-specific" should be changed to --site-specific--

Signed and Sealed this

First Day of June, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,680,644 B2 | Page 1 of 1 |
| APPLICATION NO. | : 10/697557 | |
| DATED | : March 16, 2010 | |
| INVENTOR(S) | : Rappaport et al. | |

It is certified that error appears in the above-identified patent and that said Letters Patent is hereby corrected as shown below:

On Title Page 3, Item (56), under "OTHER PUBLICATIONS", Line 13, delete "on On" and insert -- on --, therefor.

On Title Page 3, Item (56), under "OTHER PUBLICATIONS", Line 17, delete "on, On" and insert -- on --, therefor.

On Title Page 4, Item (56), under "OTHER PUBLICATIONS", Line 16, delete "Plannner" and insert -- Planner --, therefor.

On Title Page 4, Item (56), under "OTHER PUBLICATIONS", Line 46, delete "at." and insert -- al. --, therefor.

On Title Page 4, Item (56), under "OTHER PUBLICATIONS", Line 55, delete "all." and insert -- al. --, therefor.

On Title Page 4, Item (56), under "OTHER PUBLICATIONS", Line 24, delete "Measurment," and insert -- Measurement, --, therefor.

In Fig. 9A, Sheet 9 of 22, for Tag "906", in Line 1, delete "PARAMES" and insert -- PARAMETERS --, therefor.

In Fig. 17, Sheet 18 of 22, for Tag "1720", in Line 3, delete "MUNUFACTURER:" and insert -- MANUFACTURER: --, therefor.

In Column 19, Line 19, delete "compatable" and insert -- compatible --, therefor.

Signed and Sealed this
Twenty-seventh Day of November, 2012

David J. Kappos
*Director of the United States Patent and Trademark Office*